US009276795B2

(12) United States Patent
Vermani et al.

(10) Patent No.: US 9,276,795 B2
(45) Date of Patent: Mar. 1, 2016

(54) DATA TRANSMISSION COEXISTENCE WITHIN TELEVISION WHITE SPACE CHANNELS

(71) Applicant: Qualcomm Incorporated, San Diego, CA (US)

(72) Inventors: Sameer Vermani, San Diego, CA (US); Santosh Paul Abraham, San Diego, CA (US); Vincent Knowles Jones, IV, Redwood City, CA (US); Stephen Jay Shellhammer, Ramona, CA (US); Didier Johannes Richard Van Nee, Tull en't Waal (NL); Rahul Tandra, San Diego, CA (US); Albert Van Zelst, Woerden (NL)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 14/258,627

(22) Filed: Apr. 22, 2014

(65) Prior Publication Data

US 2015/0304148 A1     Oct. 22, 2015

Related U.S. Application Data

(62) Division of application No. 13/398,840, filed on Feb. 17, 2012, now abandoned.

(60) Provisional application No. 61/444,564, filed on Feb. 18, 2011, provisional application No. 61/446,428, (Continued)

(51) Int. Cl.
*H04L 27/06* (2006.01)
*H04L 27/26* (2006.01)
*H04W 16/14* (2009.01)

(52) U.S. Cl.
CPC ........ *H04L 27/2649* (2013.01); *H04L 27/2666* (2013.01); *H04W 16/14* (2013.01)

(58) Field of Classification Search
CPC . H04L 25/067; H04L 1/0045; H04L 27/2647; H04L 1/005; H04L 1/0054; H04L 5/0039; H04L 27/0006; H04W 16/14; H04W 84/12

USPC ........................................................ 375/340
See application file for complete search history.

(56) References Cited

U.S. PATENT DOCUMENTS 7,813,374 B2   10/2010   Moorti et al.
7,990,934 B2    8/2011   Arad et al.
(Continued)

FOREIGN PATENT DOCUMENTS

EP        2320614 A2    5/2011
WO    2010056885 A1    5/2010
(Continued)

OTHER PUBLICATIONS

Anonymous: "Wireless LAN Medium Access Control (MAC) and Physical Layer (PHY) specifications. Amendment 2: TV White Spaces Operation", IEEE P802.11AF /D0.09, No. Part 11, Jan. 1, 2011, pp. 1-159, XP007918708.
(Continued)

*Primary Examiner* — Juan A Torres
(74) *Attorney, Agent, or Firm* — S. Hossain Beladi

(57) ABSTRACT

Methods, systems, and/or devices are provided that permit data transmissions over unused television channels. A method operational in a receiver device, includes monitoring one or more repurposed channels within a television broadcast frequency spectrum for data waveforms, wherein waveforms of different bandwidths coexist within the one or more repurposed channels, and at least a larger waveform has a first bandwidth larger than a channel bandwidth for each repurposed channel. The method also includes receiving a waveform over a repurposed channel from among the one or more repurposed channels, wherein the received waveform has a second bandwidth smaller than the channel bandwidth. The method further includes processing the received waveform by applying a downclocking factor to a clock of the receiver device that causes the receiver device to process the received waveform according to the second bandwidth to obtain a data payload from the received waveform.

20 Claims, 17 Drawing Sheets

Related U.S. Application Data filed on Feb. 24, 2011, provisional application No. 61/450,974, filed on Mar. 9, 2011, provisional application No. 61/451,460, filed on Mar. 10, 2011, provisional application No. 61/452,417, filed on Mar. 14, 2011, provisional application No. 61/453,048, filed on Mar. 15, 2011, provisional application No. 61/453,337, filed on Mar. 16, 2011, provisional application No. 61/468,743, filed on Mar. 29, 2011.

(56) References Cited

U.S. PATENT DOCUMENTS

| | | | |
|---|---|---|---|
| 8,085,876 | B2 | 12/2011 | Gaikwad et al. |
| 8,483,155 | B1* | 7/2013 | Banerjea et al. ............ 370/329 |
| 2008/0130519 | A1* | 6/2008 | Bahl et al. ................ 370/254 |
| 2009/0116430 | A1 | 5/2009 | Bonta et al. |
| 2010/0046648 | A1 | 2/2010 | Nerella et al. |
| 2010/0118749 | A1* | 5/2010 | Lakkis et al. .............. 370/310 |
| 2010/0328541 | A1 | 12/2010 | Wu |
| 2010/0329366 | A1 | 12/2010 | Wang et al. |
| 2011/0002416 | A1 | 1/2011 | Shin et al. |
| 2011/0032875 | A1 | 2/2011 | Erceg et al. |
| 2011/0090887 | A1 | 4/2011 | Kim et al. |
| 2011/0110443 | A1* | 5/2011 | Kwon et al. ............... 375/260 |
| 2011/0268095 | A1 | 11/2011 | Kim et al. |
| 2011/0287802 | A1 | 11/2011 | Ma et al. |
| 2011/0299468 | A1 | 12/2011 | Van Nee et al. |
| 2012/0002756 | A1 | 1/2012 | Zhang et al. |
| 2012/0039284 | A1 | 2/2012 | Barbieri et al. |
| 2012/0195391 | A1* | 8/2012 | Zhang et al. .............. 375/295 |
| 2012/0213214 | A1 | 8/2012 | Vermani et al. |
| 2012/0238226 | A1 | 9/2012 | Vermani et al. |
| 2012/0263156 | A1 | 10/2012 | Abraham et al. |
| 2012/0307817 | A1* | 12/2012 | Chen et al. ................ 370/338 |
| 2012/0315944 | A1* | 12/2012 | Jeon et al. ................ 455/512 |
| 2013/0034091 | A1 | 2/2013 | Kim et al. |
| 2013/0058247 | A1* | 3/2013 | Chen et al. ................ 370/252 |
| 2013/0128807 | A1 | 5/2013 | Vermani et al. |
| 2013/0205313 | A1* | 8/2013 | Kim et al. ................. 725/14 |
| 2014/0177743 | A1* | 6/2014 | Zhang et al. .............. 375/260 |

FOREIGN PATENT DOCUMENTS

| | | | |
|---|---|---|---|
| WO | 2011102897 | A1 | 8/2011 |
| WO | 2011132837 | A1 | 10/2011 |
| WO | 2011143234 | A1 | 11/2011 |
| WO | 2012142481 | | 10/2012 |

OTHER PUBLICATIONS

Chen et al., "MAC and PHY Proposal for 802.11af", IEEE 8Q2.11-10/Q258R1, Feb. 28, 2010, pp. 1-22, XP007918749.
Franklin, A. et al., "Cognitive Radio test-bed based on ECMA-392 International Standard", 7th International Symposium on Wireless Communication Systems (ISWCS), Sep. 19, 2010, pp. 1026-1030, IEEE, XP031792067, ISBN: 978-1-4244-6315-2.
IEEE 802.11-2007, "IEEE Standard for Information Technology—Telecommunications and Information Exchange Between Systems—Local and Metropolitan Area Networks—Specific Requirements", Part 11: Wireless LAN Medium Access Control (MAC) and Physical Layer (PHY) Specifications, (Jun. 12, 2007).
International Preliminary Report on Patentability—PCT/US2012/038426, The International Bureau of WIPO—Geneva, Switzerland, Nov. 28, 2013.
International Search Report and Written Opinion—PCT/US2012/025765—ISA/EPO—Jun. 11, 2012.
International Search Report and Written Opinion—PCT/US2012/025766—ISA/EPO—Jun. 11, 2012.
International Search Report and Written Opinion—PCT/US2012/038426—ISA/EPO—Aug. 20, 2012.
Kawade S et al., "Cognitive radio-based urban wireless broadband in unused TV bands", Radioelektronika, 2010 20th International Conference, Apr. 19, 2010, pp. 1-4, XP031685259,IEEE, USA ISBN: 978-1-4244-6318-3,the whole document.
Ventink M et al., "TGaf Comments for PHY",IEEE P802.11AF Draft Standard—Local and Metropolitan Area Networks Part 11—Wireless LAN MAC and PHY Layer Specifications: TV White Space Operation, Mar. 16, 2011, pp. 1-7, XP002676217, Retrieved from the Internet: URL:https://mentor.ieee.org/802.11/dcn/11/11-11-0444-00-00af-comments-for-phy.pptx [retrieved on May 11, 2012] p. 3-p. 7.
Wang J., et al., "First Cognitive Radio Networking Standard for Personal/Portable Devices in TV White Spaces", IEEE Symposium on New Frontiers in Dynamic Spectrum, Apr. 6, 2010, pp. 1-12, IEEE, XP031664849, ISBN: 978-1-4244-5189-0.
Xia H H et al., "Spectrum sharing feasibility for CDMA PCS",Universal Personal Communications, 1994.Record., 1994 Third Annual International Conference on, Sep. 27, 1994, pp. 267-271, XP010131662, DOI: 10.1109/ICUPC.1994.383154 ISBN: 978-0-7803-1823-6 Sect. 1, 3rd par. Sect. 2, 1st and 2nd par.
Zhang, et al., "Adaptive Subcarrier Nulling: Enabling partial spectrum sharing in wireless LANs," 2011 19th IEEE International Conference on Network Protocols (ICNP), Oct. 17-20, 2011, pp. 311-320.
Kang B., et al., "MU-MIMO support for Heterogeneous Devices", IEEE 802.11-10/0784r1, pp. 1-19, Jul. 13, 2010.
Park M., et al., "TGah Use Cases Summary and Aggregated PHY Rates Analysis", IEEE 802.11-11/0299r0, pp. 1-11, Mar. 15, 2011.
Porat R., et al., "Introductory TGah Proposal", IEEE 802.11-11/0069r1, pp. 1-12, Jan. 16, 2011.
Stacey R., et al., "Specification Framework for Tgac", IEEE 802.11-09/0992r21, Jan. 19, 2011, pp. 7-16, 24-41.
Tandra R., et al., "Low Rate Enabler", IEEE 802.11-11/0364r2, pp. 1-28, Mar. 14, 2011.

* cited by examiner

| 802.11af Bandwidth | Number of Sub-Carriers | Cyclic Prefix Duration | Symbol Duration |
|---|---|---|---|
| 5 MHz | 64 | 3.2 μs | 16 μs |
| 10 MHz | 64 | 1.6 μs | 8 μs |
| 20 MHz | 64 | 0.8 μs | 4 μs |

FIG. 2

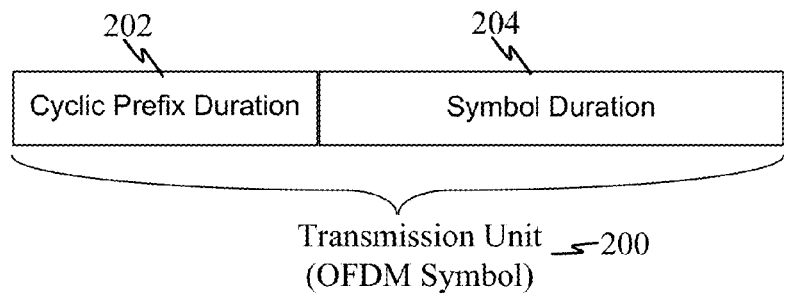

FIG. 3

| 802.11af Bandwidth (3.2 μs Cyclic Prefix) | Corresponding 802.11ac Bandwidth | Number of Sub-Carriers | Cyclic Prefix Duration | Symbol Duration (Includes CP) |
|---|---|---|---|---|
| 5 MHz | 20 MHz | 64 | 3.2 μs | 16 μs |
| 10 MHz | 40 MHz | 128 | 3.2 μs | 16 μs |
| 20 MHz | 80 MHz | 256 | 3.2 μs | 16 μs |

FIG. 4

| 802.11af Bandwidth (6.4 μs Cyclic Prefix) | Corresponding 802.11ac Bandwidth | Number of Sub-Carriers | Cyclic Prefix Duration | Symbol Duration (Includes CP) |
|---|---|---|---|---|
| 5 MHz | 40 MHz | 128 | 6.4 μs | 32 μs |
| 10 MHz | 80 MHz | 256 | 6.4 μs | 32 μs |
| 20 MHz | 160 MHz | 512 | 6.4 μs | 32 μs |

FIG. 5

| 802.11af Bandwidth (8 µs Cyclic Prefix) | Corresponding 802.11ac Bandwidth | Number of Sub-Carriers | Cyclic Prefix Duration | Symbol Duration (Includes CP) |
|---|---|---|---|---|
| 4 MHz | 40 MHz | 128 | 8 µs | 40 µs |
| 8 MHz | 80 MHz | 256 | 8 µs | 40 µs |
| 16 MHz | 160 MHz | 512 | 8 µs | 40 µs |

DATA TRANSMISSION COEXISTENCE WITHIN TELEVISION WHITE SPACE CHANNELS

CROSS REFERENCE TO RELATED APPLICATIONS

The present application is a divisional patent application of commonly owed U.S. patent application Ser. No. 13/398,840, filed Feb. 17, 2012, which claims priority to U.S. Provisional Applications No. 61/444,564, filed Feb. 18, 2011, No. 61/446,428, filed Feb. 24, 2011, No. 61/450,974, filed Mar. 9, 2011, No. 61/451,460, filed Mar. 10, 2011, No. 61/452,417, filed Mar. 14, 2011, No. 61/453,048, filed Mar. 15, 2011, No. 61/453,337, filed Mar. 16, 2011, No. 61/468,743, filed Mar. 29, 2011, the contents of which are expressly incorporated herein by reference in their entirety. Moreover, the contents of the U.S. Non-Provisional application Ser. No. 13/398,842, titled: DATA TRANSMISSION COEXISTENCE USING CONSTANT SYMBOL DURATION WITHIN TELEVISION WHITE SPACE CHANNELS, filed on Feb. 17, 2012, is incorporated by reference herein.

FIELD

Various features relate to wireless communication devices and systems, and more particularly to methods and apparatuses for facilitating reuse of white space frequencies for wireless communications (e.g., local wireless networks, wi-fi networks, etc.).

BACKGROUND

Access terminals, such as laptop computers, personal digital assistant devices, mobile or cellular phones, personal media players, or other devices with a processor, that communicate through wireless signals are becoming increasingly popular and are used more frequently. Many access terminals are adapted to communicate via Wireless Local Area Networks (WLAN), and several emerging wireless communications standards have been developed and are being developed for facilitating such WLANs.

The Institute of Electronics and Electrical Engineers (IEEE) has developed various WLAN standards (or revisions) under the umbrella of its IEEE 802.11 standard. IEEE 802.11 denotes a set of WLAN air interface standards developed by the IEEE 802.11 committee for short-range communications (e.g., tens of meters to a few hundred meters). Such WLAN networks are often referred to as "WiFi" or "wi-fi" networks and allow electronic devices to communication wirelessly (e.g., exchange data, access other networks, etc.).

However, the available frequency spectrum for such wireless networks is quite limited and there is an ever increasing need for bandwidth demanded by wireless communications systems. As such, reuse of, and/or co-existence with, existing frequency spectrum allocations is desirable. One relatively recent development corresponds to implementing a WLAN using white space (also referred to as whitespace). "White space" may refer to radio frequencies allocated to a broadcasting service but not used locally (e.g., within short range). In the U.S., the Federal Communication Commission (FCC) Report and Order (R&O) recently opened up an opportunity of unlicensed usage of the white space. Use of white space for implementing a WLAN according to the IEEE 802.11 standard is being developed under an amendment to the IEEE 802.11 referred to as IEEE 802.11af. "White-fi" is a term being used to describe the use of a Wi-Fi technology within the TV unused spectrum, or TV white space. Television channels have typical bandwidths of 5 MHz in the U.S., but bandwidths may be different (e.g., 6 MHz, etc.) in other countries.

The specification of IEEE 802.11af proposes "clocking down" an 802.11n 20 MHz signal by different factors for different bandwidths (BWs). Such a design expands cyclic prefix (CP) length and symbol duration by a down clocking factor, for example by a factor of 4 (to 3.2 µs) in 5 MHz transmissions. Such design may raise various issues. First, such a design may present provisions for much greater delay spreads only in 5 MHz mode. A large delay tolerance may be needed for 10 and 20 MHz modes too due to larger range if TV White Space (TVWS) signals. Secondly, co-existence of different BW devices within a basic service set (BSS) may not be supported. For example, a 5 MHz device may not be able to decode a preamble of a 10 MHz transmission since the symbol durations are different. Thirdly, overlapping basic service set (OBSS) co-existence may not be supported.

Consequently, there is a need for solutions that permit the co-existence wi-fi transmissions in television white space.

SUMMARY

According to one example, a method for transmitting data over a television white space channel is provided. A transmitter device may identify an unused channel within a television broadcast frequency spectrum. The television broadcast frequency spectrum may be pre-divided into a plurality of channels of equal bandwidth and the unused channel is selected and repurposed for data transmissions from among the plurality of channels. In one example, the transmitter device may ascertain whether a channel is in use by scanning channels for a signal identifier occurring within an overlapping frequency region between the downclocked waveform and larger waveform, wherein the downclocked waveform and overlapping frequency region have the same center frequency and the overlapping frequency region has a fourth bandwidth. In another example, identifying the unused channel includes at least one of: (a) querying a remote database to ascertain unused television channels for a particular region; and/or (b) listening on one or more channels to ascertain the energy in such channels, and selecting the channel with the least amount of energy.

The transmitter device may then generate a downclocked waveform by applying a factor to a clock that causes a waveform bandwidth to be reduced from a first bandwidth to a second bandwidth, wherein the second bandwidth of the downclocked waveform is less than a channel bandwidth for the identified unused channel. In one example, generating the downclocked waveform may further comprise increasing a cyclic prefix duration and symbol duration for a symbol within the downclocked waveform relative to a waveform generated using the clock and spanning the first bandwidth. The downclocked waveform is defined in accordance with one or more standards of the Institute of Electronics and Electrical Engineers (IEEE) 802.11 family of standards. The factor may be dynamically selected from a set of factors that includes two or more of: 4, 5, 6.66, 8, and 10. The factor may be dynamically selected based on an operating location of the transmitter device.

The downclocked waveform may be configured so that it coexists with a larger waveform having a third bandwidth that is greater than the channel bandwidth. For example, the downclocked waveform and the larger waveform may have the same fixed symbol duration. The downclocked waveform may also have a first guard band that is different than a second guard band for the larger waveform, a guard band defining an unused frequency space between an edge of the unused channel and a corresponding edge of the downclocked waveform. The larger waveform may be transmitted over a plurality of contiguous unused channels.

In one example, configuring the downclocked waveform may include identifying an overlapping frequency region between the downclocked waveform and the larger waveform, wherein the downclocked waveform and the overlapping frequency region have the same center frequency and the overlapping frequency region has a fourth bandwidth. A first portion of a preamble for the downclocked waveform may then be transmitted/encoded over the fourth bandwidth of the overlapping region. A second portion of the preamble may be transmitted/encoded over the full second bandwidth of the downclocked waveform. In one example, an orthogonal frequency-division multiplexing (OFDM) symbol may be transmitted over the full second bandwidth of the downclocked waveform.

In another example, a preamble for the downclocked waveform may be generated, wherein the preamble includes: (a) a first preamble portion encoded within a fourth bandwidth of the downclocked waveform, where the fourth bandwidth is smaller than the second bandwidth; and/or (b) a second preamble portion encoded over the full second bandwidth of the downclocked waveform. The first preamble portion may include a duration indictor for the downclocked waveform.

The downclocked waveform may then be wireless transmitted from the transmitter device over the identified unused channel.

According to a second example, a method for transmitting data over a television white space channel is provided. A transmitter device may identify an unused channel within a television broadcast frequency spectrum, the unused channel having a pre-defined channel bandwidth. The television broadcast frequency spectrum may be pre-divided into a plurality of channels of equal bandwidth and the unused channel is selected and repurposed for data transmissions from among the plurality of channels. In one example, the second bandwidth of the downclocked waveform may be equal to the channel bandwidth.

A downclocked waveform may then be generated by applying a factor to a clock that causes a waveform bandwidth to be reduced from a first bandwidth to a second bandwidth while maintaining a constant symbol duration for all bandwidths within an operating regulatory domain. The pre-defined channel bandwidth may be associated with the operating regulatory domain and varies between two different regulatory domains. The operating regulatory domain may be associated with a region and defines a wireless communication standard applied in that region. For instance, the factor may be dynamically selected from a set of factors that includes two or more of: 4, 5, 6.66, 8, and 10. Symbol duration for all bandwidths may be maintained constant by increasing a number of sub-carriers for the downclocked waveform as bandwidth is increased. The downclocked waveform may then be transmitted over the identified unused channel.

The method may further append a preamble to the downclocked waveform, the preamble including a short training field (STF). In one example, the downclocked waveform may be one of either: (a) a 5 MHz waveform based on a 128 point inverse fast Fourier Transform (IFFT) and the short training field is created by populating every eighth tone of 117 non-guard tones as defined for an IEEE 802.11n 40 MHz compatible waveform; (b) a 5 MHz waveform based on a 128 point inverse fast Fourier Transform (IFFT) and the short training field is created by populating every eighth tone of 117 non-guard tones as defined for an IEEE 802.11n 80 MHz compatible waveform; (c) a 5 MHz waveform based on a 256 point IFFT and the short training field is created by populating every sixteenth tone of 237 non-guard tones as defined for an IEEE 802.11ac compatible 80 MHz waveform; or (d) a 5 MHz waveform based on a 256 point IFFT and the short training field is created by populating every eighth tone of 237 non-guard tones as defined for an IEEE 802.11ac 80 MHz waveform.

In another example, the downclocked waveform may be one of either: (a) a 6 MHz waveform based on a 128 point IFFT and the short training field is created by populating every eighth tone of 117 non-guard tones as defined for an IEEE 802.11n compatible 40 MHz waveform; (b) a 6 MHz waveform based on a 256 point IFFT and the short training field is created by populating every sixteenth tone of 237 non-guard tones as defined for an IEEE 802.11ac compatible 80 MHz waveform; or (c) a 6 MHz waveform based on a 256 point IFFT and the short training field is created by populating every eighth tone of 237 non-guard tones as defined for an IEEE 802.11 ac compatible 80 MHz waveform.

In another example, the downclocked waveform may be one of either: (a) an IEEE 802.11n specification high-throughput signal (HT-SIG) field in a single orthogonal frequency-division multiplexing (OFDM) symbol by utilizing 108 data tones in a 5 MHz waveform obtained by down-clocking an IEEE 802.11n compatible 40 MHz waveform; (b) an IEEE 802.11ac specification high-throughput signal (VHT-SIGA) field in a single OFDM symbol by utilizing 108 data tones in a 5 MHz waveform obtained by down-clocking a IEEE 802.11ac compatible 40 MHz waveform; or (c) an IEEE 802.11ac specification VHT-SIGA field in a single OFDM symbol by utilizing 234 data tones in a 5 MHz waveform obtained by down-clocking a IEEE 802.11ac compatible 80 MHz waveform.

In another example, the downclocked waveform may be one of either: (a) an 802.11n specification HT-SIG field in a single OFDM symbol by utilizing 108 data tones in a 6 MHz waveform obtained by down clocking a 802.11n compatible 40 MHz waveform; (b) an 802.11ac specification VHT-SIGA field in a single OFDM symbol by utilizing 108 data tones in a 6 MHz waveform obtained by down clocking a 802.11ac compatible 40 MHz waveform; or (c) an 802.11a specification VHT-SIGA field in a single OFDM symbol by utilizing the 234 data tones in a 6 MHz waveform obtained by down clocking a 802.11ac compatible 80 MHz waveform.

The methods of FIGS. 17 and 18 may be implemented with different downclocked waveforms.

In a first example, to generate 5 MHz transmissions/waveforms, the downclocked waveform may be generated based on at least one of: (a) a forty (40) MHz IEEE 802.11n specification waveform that is downclocked to a five (5) MHz bandwidth waveform and the factor is eight (8); (b) a forty (40) MHz IEEE 802.11ac specification waveform that is downclocked to a five (5) MHz bandwidth waveform and the factor is eight (8); and/or (c) an eighty (80) MHz IEEE 802.11ac specification waveform that is downclocked to a five (5) MHz bandwidth waveform and the factor is sixteen (16). This example may be useful, for example, where the available channel has a bigger bandwidth (e.g., 6 MHz channel) but spectral requirements imposed to minimize inter-channel interference may force using only a portion of the available bandwidth.

In a second example, to generate 6 MHz transmissions/waveforms, the downclocked waveform may be generated based on at least one of: (a) a forty (40) MHz IEEE 802.11n specification waveform that is downclocked to a six (6) MHz bandwidth waveform and the factor is 40/6; (b) a forty (40) MHz IEEE 802.11ac specification waveform that is downclocked to a six (6) MHz bandwidth waveform and the factor is 40/6; and/or (c) an eighty (80) MHz IEEE 802.11ac specification waveform that is downclocked to a six (6) MHz bandwidth waveform and the factor is 80/6. This example may be useful, for example, where the full bandwidth of the available channel (e.g., 6 MHz channel) may be utilized. For instance, where a mask is pre-applied to a transmission/waveform such that its spectral runoff is minimal, then the bandwidth used for data transmissions may be the same or approximately the same as the channel bandwidth. For example, such mask may serve to pre-distort the waveform such that its spectral runoff or leakage is reduced, minimized, and/or eliminated, thereby allowing the waveform/transmission to occupy the full channel bandwidth.

In a third example, to generate 7 MHz transmissions/waveforms, the downclocked waveform may be generated based on at least one of: (a) a forty (40) MHz IEEE 802.11ac specification waveform that is downclocked to a seven (7) MHz bandwidth waveform and the factor is 40/7; and/or (b) a forty (40) MHz IEEE 802.11n specification waveform that is downclocked to a seven (7) MHz bandwidth waveform and the factor is 40/7.

In a fourth example, to generate 8 MHz transmissions/waveforms, the downclocked waveform may be generated based on at least one of: (a) a forty (40) MHz IEEE 802.11ac specification waveform that is downclocked to an eight (8) MHz bandwidth waveform and the factor is 40/8; and/or (b) a forty (40) MHz IEEE 802.11n specification waveform that is downclocked to an eight (8) MHz bandwidth waveform and the factor is 40/8. This example may be useful, for example, where the television spectrum is divided in to 8 MHz channels and/or data transmissions make use of the full available channel bandwidth.

In a fifth example, to generate 10 MHz transmissions/waveforms, the downclocked waveform may be generated based on at least one of: (a) a forty (40) MHz IEEE 802.11n specification waveform that is downclocked to a ten (10) MHz bandwidth waveform and the factor is four (4); (b) a forty (40) MHz IEEE 802.11ac specification waveform that is downclocked to a ten (10) MHz bandwidth waveform and the factor is four (4); and/or (c) a forty (40) MHz IEEE 802.11n specification waveform that is downclocked to a ten (10) MHz bandwidth waveform and the factor is four (4). This example may be useful, for example, where the two adjacent channels of smaller bandwidth are used to carry a larger bandwidth signal/waveform.

In a sixth example, to generate 12 MHz transmissions/waveforms, the downclocked waveform may be generated based on at least one of: (a) an eighty (80) MHz IEEE 802.11ac specification waveform that is downclocked to a twelve (12) MHz bandwidth waveform and the factor is 40/6; (b) two forty (40) MHz IEEE 802.11n specification waveforms that are downclocked and combined to a twelve (12) MHz bandwidth waveform and the factor is 40/6; (c) two forty (40) MHz IEEE 802.11 ac specification waveforms that are downclocked and combined to a twelve (12) MHz bandwidth waveform and the factor is 40/6; (d) a one hundred sixty (160) MHz IEEE 802.11ac specification waveform that is downclocked to a twelve (12) MHz bandwidth waveform and the factor is 160/12; and/or (e) an eighty (80)+eighty (80) MHz IEEE 802.11ac specification waveforms that are downclocked and combined to a twelve (12) MHz bandwidth waveform and the factor is 160/12.

In a seventh example, to generate 14 MHz transmissions/waveforms, the downclocked waveform may be generated based on at least one of: (a) two forty (40) MHz IEEE 802.11n specification waveforms that are downclocked and combined to a fourteen (14) MHz bandwidth waveform and the factor is 40/7; and/or (b) an eighty (80) MHz IEEE 802.11ac specification waveform that is downclocked to a fourteen (14) MHz bandwidth waveform and the factor is 40/7.

In an eighth example, to generate 16 MHz transmissions/waveforms, the downclocked waveform may be generated based on at least one of: (a) two forty (40) MHz IEEE 802.11n specification waveforms that are downclocked and combined to a sixteen (16) MHz bandwidth waveform and the factor is 40/8; and/or (b) an eighty (80) MHz IEEE 802.11ac specification waveform that is downclocked to a sixteen (16) MHz bandwidth waveform and the factor is 40/8.

In a ninth example, to generate 20 MHz transmissions/waveforms, the downclocked waveform may be generated based on at least one of: (a) an eighty (80) MHz IEEE 802.11ac specification waveform that is downclocked to a twenty (20) MHz bandwidth waveform and the factor is four (4); (b) two forty (40) MHz IEEE 802.11n specification waveforms that are downclocked and then combined into a twenty (20) MHz bandwidth waveform and the factor is four (4); (c) a one hundred-sixty (160) MHz IEEE 802.11ac specification waveform that is downclocked to a twenty (20) MHz bandwidth waveform and the factor is eight (8); and/or (d) an eighty (80)+eighty (80) MHz IEEE 802.11ac specification waveform that is downclocked to a twenty (20) MHz bandwidth waveform and the factor is eight (8).

In a tenth example, to generate 24 MHz transmissions/waveforms, the downclocked waveform may be generated based on at least one of: 16. The method of claim 1, wherein the waveform is at least one of: (a) a one hundred sixty (160) MHz IEEE 802.11ac specification waveform that is downclocked to a twenty-four (24) MHz bandwidth waveform and the factor is 40/6; (b) an eighty (80)+eighty (80) MHz IEEE 802.11ac specification waveform that is downclocked and combined to a twenty-four (24) MHz bandwidth waveform and the factor is 40/6; (c) four forty (40) MHz IEEE 802.11n specification waveforms that is downclocked and combined to a twenty-four (24) MHz bandwidth waveform and the factor is 40/6; and/or (d) four forty (40) MHz IEEE 802.11ac specification waveforms that is downclocked and combined to a twenty-four (24) MHz bandwidth waveform and the factor is 40/6.

In an eleventh example, to generate 28 MHz transmissions/waveforms, the downclocked waveform may be generated based on at least one of: (a) four forty (40) MHz IEEE 802.11 ac specification waveforms that are downclocked and combined to a twenty-eight (28) MHz bandwidth waveform and the factor is 40/7; and/or (b) two eighty (80) MHz IEEE 802.11ac specification waveforms that are downclocked and combined to a twenty-eight (28) MHz bandwidth waveform and the factor is 40/7.

In a twelfth example, to generate 32 MHz transmissions/waveforms, the waveform may be generated based on at least one of: (a) four forty (40) MHz IEEE 802.11n specification waveforms that are downclocked and combined to a thirty-two (32) MHz bandwidth waveform and the factor is 40/8; and/or (b) two eighty (80) MHz IEEE 802.11ac specification waveform that is downclocked and combined to a thirty-two (32) MHz bandwidth waveform and the factor is 40/8.

In a thirteenth example, to the downclocked waveform may be generated from least one of: (a) two forty (40) MHz IEEE 802.11ac specification waveforms that are downclocked and combined into a ten (10) MHz bandwidth waveform and the factor is 8; (b) two forty (40) MHz IEEE 802.11ac specification waveforms that are downclocked and combined into two five (5) MHz+five (5) MHz bandwidth waveform and the factor is 8; (c) two twenty (20) MHz IEEE 802.11ac specification waveforms that are downclocked and combined into an eight (8) MHz bandwidth waveform and the factor is 5; (d) two twenty (20) MHz IEEE 802.11ac specification waveforms that are downclocked and combined to a ten (10) MHz bandwidth waveform and the factor is 4; and/or (e) two forty (40) MHz IEEE 802.11ac specification waveforms that are downclocked and combined to a sixteen (16) MHz bandwidth waveform and the factor is 5.

In yet another example, a method for receiving data over a television white space channel. A receiver device may monitor one or more repurposed channels within a television broadcast frequency spectrum for data waveforms, wherein waveforms of different bandwidths coexist within the one or more repurposed channels, and at least a larger waveform has a first bandwidth larger than a channel bandwidth for each repurposed channel. The television broadcast frequency spectrum may be pre-divided into a plurality of channels of equal bandwidth and the repurposed channel is selected and repurposed for data transmissions from among the plurality of channels.

The receiver device may also receive a waveform over a repurposed channel from among the one or more repurposed channels, wherein the received waveform has a second bandwidth smaller than the channel bandwidth. The received waveform and larger waveform have the same fixed symbol duration.

The receiver device may also process the received waveform by applying a downclocking factor to a clock of the receiver device that causes the receiver device to process the received waveform according to the second bandwidth to obtain a data payload from the received waveform. In one example, the received waveform may have a first guard band that is different than a second guard band for the larger waveform, a guard band defining an unused frequency space between an edge of the unused channel and a corresponding edge of the downclocked waveform. The received waveform may be defined (at least partially) in accordance with one or more standards of the Institute of Electronics and Electrical Engineers (IEEE) 802.11 family of standards (e.g., preamble structures may be consistent with IEEE 802.11af and/or 802.11n specifications). The downclocking factor may be dynamically selected from a set of factors that includes two or more of: 4, 5, 6.66, 8, and 10. The downclocking factor may be dynamically selected based on an operating location of the receiver device.

In one example, processing the received waveform may include identifying an overlapping frequency region between the received waveform and the larger waveform, wherein the received waveform and the overlapping frequency region have the same center frequency and the overlapping frequency region has a third bandwidth. The received waveform may include: (a) a first portion of a preamble that is encoded within the third bandwidth of the overlapping frequency region; and/or (b) a second portion of the preamble encoded over the full second bandwidth of the received waveform. The received waveform includes an orthogonal frequency-division multiplexing (OFDM) symbol over the full second bandwidth of the received waveform. The method may further ascertain a waveform duration (e.g., PHY frame duration) in the repurposed channel by monitoring for a signal identifier occurring within the first preamble portion.

In another example, the received waveform may include: (a) a first portion of a preamble that is encoded within a third bandwidth that is smaller than the second bandwidth of the received waveform; and/or (b) a second portion of the preamble encoded over the full second bandwidth of the received waveform.

In yet another example, a method for receiving data over a television white space channel is provided. One or more repurposed channels of a television broadcast frequency spectrum may be monitored for data waveforms, wherein waveforms of different bandwidths coexist within the one or more repurposed channels. A waveform may be received over a repurposed channel from among the one or more repurposed channels, wherein the received waveform has a second bandwidth smaller than the channel bandwidth. The received waveform may be processed by applying a factor to a clock that causes a waveform bandwidth to be reduced from a first bandwidth to a second bandwidth, wherein waveforms of all bandwidths within an operating regulatory domain have a constant symbol duration. A data payload may then be extracted or obtained from the received waveform. The second bandwidth of the downclocked waveform may be equal to the channel bandwidth. The factor may be dynamically selected from a set of factors that includes two or more of: 4, 5, 6.66, 8, and 10. The television broadcast frequency spectrum may be pre-divided into a plurality of channels of equal bandwidth and the unused channel is selected and repurposed for data transmissions from among the plurality of channels. The pre-defined channel bandwidth may be associated with the operating regulatory domain and varies between two different regulatory domains. The operating regulatory domain may be associated with a region and defines a wireless communication standard applied in that region.

BRIEF DESCRIPTION OF THE DRAWINGS

FIG. 2 illustrates a table of physical layer (PHY) parameters according to the IEEE 802.11af specification.

FIG. 3 illustrates an exemplary transmission unit, such as an orthogonal frequency-division multiplexing (OFDM) symbol.

FIG. 4 illustrates a table of physical layer (PHY) parameters for an alternative IEEE 802.11af compatible transmission as a down-clocked version of an IEEE 802.11ac-compliant transmission using a factor of four.

FIG. 5 illustrates a table of physical layer (PHY) parameters for an alternative IEEE 802.11af compatible transmission as a down-clocked version of an IEEE 802.11ac-compliant transmission using a factor of eight.

DETAILED DESCRIPTION

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

Exemplary Network Environment

Figure 1:
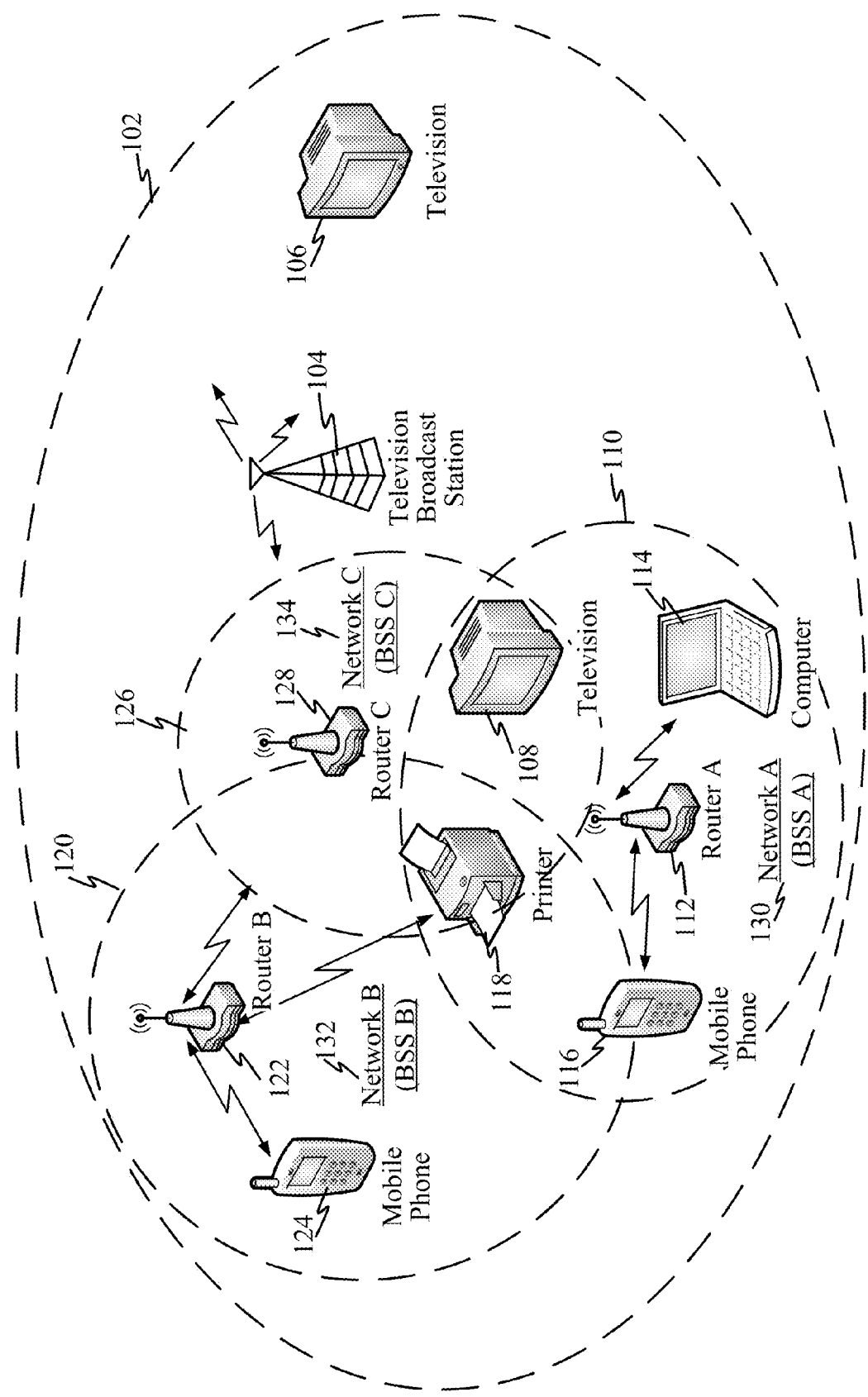
FIG. 1 is a block diagram illustrating an exemplary operating environment in which various features for performing wifi transmissions over television white space may be implemented.

FIG. 1 is a block diagram illustrating an exemplary operating environment in which various features for performing wifi transmissions over television white space may be implemented. A television broadcast station 104 may be configured to broadcast television content or programming over one or more defined channels in a frequency spectrum. For example, television channels may be defined as 6 MHz or 8 MHz segments within a frequency spectrum. The television broadcast station 104 may have a relatively large coverage area or region 102 in which one or more televisions 106 and 108 (and/or other devices) may be configured to capture the television content and play it.

While one or more channels may be defined for television content or programming within the frequency spectrum, there are typically many unused channels within a given coverage area or region 102. Sometimes, channels may be left unused to avoid interfering with adjoining channel transmissions. However, within a smaller area(s) or region(s) 110, 120, and/or 126 the unused television channels (referred as white space) may be reused by other devices for local or shorter range transmissions by a local wireless network (e.g., wifi network, peer-to-peer transmissions, etc.). That is, because the local wireless network has a shorter range, it operates at a lower transmission power and such transmissions are less likely to interfere with television broadcast transmissions.

In this example, three local wireless area networks 130, 132, and/or 134 are illustrated. In the first wireless network 130, a first wireless router 112 may facilitate communications, to, from, and/or between, a plurality of nearby electronic devices, such as a computer 114 and/or a mobile phone 116, within a first region 110. In the second wireless network 132, a second wireless router 122 may facilitate communications, to, from, and/or between, a plurality of nearby electronic devices, such as a printer 118 and a mobile phone 124, within a second region 120. Similarly, in the third wireless network 134, a third wireless router 128 may facilitate communications, to, from, and/or between, a plurality of nearby electronic devices within a third region 126. Note that each wireless router 112, 122, and/or 128 may provide wireless connectivity to the nearby electronic devices, enabling them to communicate with other devices within the network and/or with devices on other (remote) networks.

It should be appreciated that the wireless networks 130, 132, and/or 134 may have overlapping coverage areas. Consequently, transmissions over the various wireless networks should coexist to prevent interfering with each other. In IEEE 802.11 wireless specifications, each wireless network 130, 132, and/or 134 is said to implement a basic service set (BSS), e.g., defined by the access point (router) and the stations (electronic devices) it serves.

In one example, the frequency spectrum utilized for television broadcasts may be in the range of 54 to 72 megahertz (MHz), 76 through 88 MHz, 174 to 216 MHz, and/or 470 to 806 MHz. However, the television frequency spectrum ranges may vary for different territories and countries. Consequently, the white space referred to herein may span different ranges of the frequency spectrum.

Reuse of Unused Television Channels Under 802.11af

Because frequency spectrum for wireless networks is in demand, one proposed solution in the IEEE 802.11af specification is to reuse television channels that are unused in a particular region. The various examples discussed herein refer to transmission, signals, and/or waveforms at a physical layer (PHY) or layer 1 of a communication protocol having multiple layers. The physical layer may define the basic networking hardware transmission technologies and/or protocol of a network. It is a fundamental layer underlying the logical data structures of the higher level functions in a network. The physical layer may define the means of transmitting raw bits rather than logical data packets over a physical link connecting network nodes. The physical layer often provides an electrical, mechanical, and/or procedural interface to the transmission medium. The shapes and properties of the electrical connectors, the frequencies to broadcast on, the modulation scheme to use and similar low-level parameters, are specified by the physical layer or layer 1.

FIG. 2 illustrates a table of physical layer (PHY) parameters according to the IEEE 802.11af specification. The IEEE 802.11af specification proposes "down clocking" an IEEE 802.11n 20 MHz transmission (e.g., a transmission having a 20 MHz bandwidth) by different factors for different bandwidths (BWs). Such a design expands cyclic prefix (CP) duration and symbol duration by a down clocking factor.

"Downclocking" may refer to reducing or decreasing the frequency of a transmission or waveform. In this example, the transmission clock for a device may be divided by a factor such that the number of sub-carriers (tones) remain the same (e.g., 64 tones) while the bandwidth is reduced but the transmission unit duration is extended. For example, a 20 MHz transmission is downclocked by a factor of four (4) to a 5 MHz transmission. Meanwhile, the cyclic prefix (CP) duration and symbol duration of the 20 MHz transmission is increased by the same factor of four (4) such that the original CP duration of 0.8 µseconds is expanded to 3.2 µseconds and the original symbol duration of 4 µseconds is expanded to 16 µseconds.

Similarly, a 20 MHz transmission may be downclocked by a factor of two (2) to a 10 MHz transmission. Meanwhile, the cyclic prefix (CP) duration and symbol duration of the 20 MHz transmission is increased by the same factor of two (2) such that the original CP duration of 0.8 µseconds is expanded to 3.2 µseconds and the original symbol duration of 4 µseconds is expanded to 8 µseconds.

FIG. 3 illustrates an exemplary transmission unit, such as an orthogonal frequency-division multiplexing (OFDM) symbol. Here, the typical transmission unit 200 includes a cyclic prefix (CP) duration 202 and the symbol duration 204.

The design illustrated in FIG. 2 has several shortcomings First, such a design may present provisions for much greater delay spreads only in 5 MHz mode. A large delay tolerance may be needed for 10 MHz and 20 MHz modes too due to the larger range of TV White Space (TVWS) signals. Second, coexistence of different bandwidth devices within a basic service set (BSS) may not be supported. For example, a 5 MHz device may not be able to decode, detect, and/or recognize a preamble of a 10 MHz transmission since the symbol durations are different. Third, overlapping basic service set (OBSS) co-existence may not be supported.

FIG. 4 illustrates a table of physical layer (PHY) parameters for an alternative IEEE 802.11af compatible transmission as a down-clocked version of an IEEE 802.11ac-compliant transmission using a factor of four. According to this feature, a constant down-clocking factor may be applied for all bandwidths. For example, a down-clocking factor of four (4) may be used for transmissions of different bandwidths. While the cyclic prefixes and symbol duration for all bandwidths remain constant, 3.2 µseconds and 16 µseconds, respectively, the number of sub-carriers (tones) is varied depending on the bandwidth sought. For instance, in this example, an IEEE 802.11ac-compliant 20 MHz transmission may be downclocked by a factor of four (4) while using 64 sub-carriers. Similarly, an IEEE 802.11ac-compliant 40 MHz transmission may be downclocked by a factor of four (4) while using 128 sub-carriers. Likewise, an IEEE 802.11ac-compliant 40 MHz transmission may be downclocked by a factor of four (4) while using 256 sub-carriers.

In effect, the downclocking factor may cause a clock for a transmitter chain to be slowed down according to the downclocking factor such that the clock provided to one or more transmitter components is also slowed. By slowing the clock from a first frequency to a second frequency, the bandwidth is also reduced (relative to the bandwidth provided by the original clock) from a first bandwidth (e.g., corresponding to the original clock) to a second bandwidth (e.g., corresponding to the downclocked/slowed clock). However, to compensate for the reduced bandwidth, one aspect also increases the sub-carriers used, thereby retaining the effective data throughput. More specifically, for different bandwidths, the sub-carriers are increased such that the symbol duration remains constant.

FIG. 5 illustrates a table of physical layer (PHY) parameters for an alternative IEEE 802.11af compatible transmission as a down-clocked version of an IEEE 802.11ac-compliant transmission using a factor of eight. According to this example, a constant down-clocking factor of eight (8) may be used for transmissions of different bandwidths. While the cyclic prefixes and symbol duration for all bandwidths remain constant, 6.4 µseconds and 32 µseconds, respectively, the number of sub-carriers (tones) is varied depending on the bandwidth sought. For instance, in this example, an IEEE 802.11ac-compliant 40 MHz transmission may be downclocked by a factor of eight (8) while using 128 sub-carriers (tones). Similarly, an IEEE 802.11ac-compliant 80 MHz transmission may be downclocked by a factor of eight (8) while using 256 sub-carriers (tones). Likewise, an IEEE 802.11ac-compliant 160 MHz transmission may be downclocked by a factor of eight (8) while using 512 sub-carriers.

Figures 6, 7:
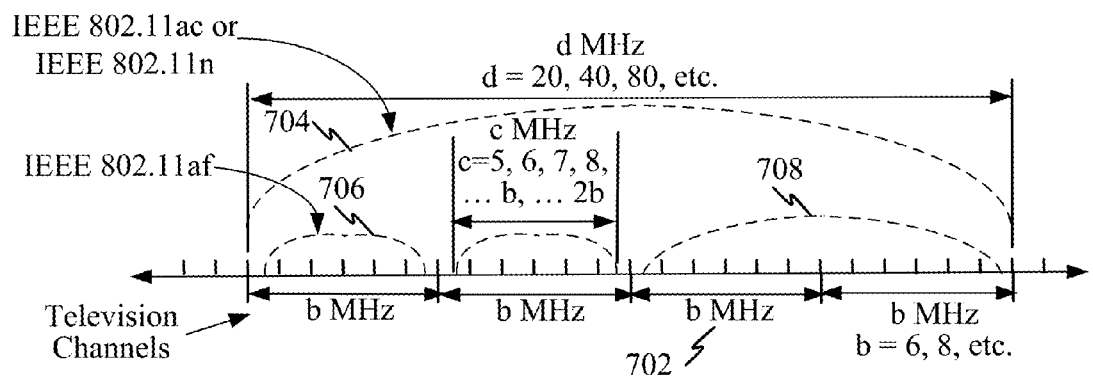
FIG. 6 illustrates a table of physical layer (PHY) parameters for yet another alternative IEEE 802.11af-compatible transmission as a down-clocked version of an IEEE 802.11ac-compliant transmission using a factor of ten.
FIG. 7 is a diagram illustrating that the downclocking of a transmission from a first bandwidth to a second bandwidth within a television channel.

FIG. 6 illustrates a table of physical layer (PHY) parameters for yet another alternative IEEE 802.11af-compatible transmission as a down-clocked version of an IEEE 802.11ac-compliant transmission using a factor of ten. According to this example, a constant down-clocking factor of ten (10) may be used for transmissions of different bandwidths. While the cyclic prefixes and symbol duration for all bandwidths remain constant, 8 µseconds and 40 µseconds, respectively, the number of sub-carriers (tones) is varied depending on the bandwidth sought. For instance, in this example, an IEEE 802.11ac-compliant 40 MHz transmission may be downclocked by a factor of ten (10) while using 128 sub-carriers (tones). Similarly, an IEEE 802.11ac-compliant 80 MHz transmission may be downclocked by a factor of ten (10) while using 256 sub-carriers (tones). Likewise, an IEEE 802.11ac-compliant 160 MHz transmission may be downclocked by a factor of ten (10) while using 512 sub-carriers.

FIG. 7 is a diagram illustrating that the downclocking of a transmission from a first bandwidth to a second bandwidth within a television channel 702. Here, the television frequency spectrum may be divided into channels b MHz wide, where b=6, 8, 10, 12, etc. As illustrated in FIGS. 4, 5, and 6, an IEEE 802.11ac or 802.11n compliant waveform or transmission 704 (e.g., d MHz wide, where d=20, 40, 80, 160, etc.) may be downclocked to a smaller bandwidth waveform or transmission 706 and/or 708 (c MHz wide, where c=5, 6, 7, 8, etc.) that fits within the smaller television channels. In some examples, c<b (i.e., bandwidth used for data transmissions is less than television channel space) because of spectral requirements that are imposed to minimize interference (e.g., caused by harmonics) between channels. However, in other implementations, where for example a mask is pre-applied to a transmission/waveform such that its spectral runoff is minimal, c≈b (i.e., bandwidth used for data transmissions is the same or approximately the same as the television channel space). Such mask may serve to pre-distort the waveform such that its spectral runoff is reduced, minimized, and/or eliminated, thereby allowing the waveform/transmission to occupy the full channel bandwidth.

The downclocking approach illustrated in FIGS. 4-7 may solve the first and second issues discussed above (e.g., delay spread and coexistence of different bandwidth devices within a BSS). The illustrated designs of FIGS. 4-7 may provide a constant CP (e.g., of 3.2 µs) and/or a constant symbol duration (e.g., for all bandwidths), allowing existence issue within a BSS (e.g., a 5 MHz device may still be able to recognize a 5 MHz segment of a 10 MHz transmission). Further, such design may allow rules for 20 MHz, 40 MHz, and 80 MHz co-existence, described with reference to IEEE 802.11ac, to be migrated to IEEE 802.11af.

However, the designs of FIG. 4-7 alone may not solve the OBSS co-existence problem where transmissions from a first BBS may not be understood, detected, and/or recognized by a second BSS. For instance, a 5 MHz transmission may be at different locations within a 6 MHz channel band depending upon the bandwidth of the basic service set (BSS). For example, 5 MHz transmissions (in a first BSS) and 10 MHz transmissions (in a neighboring second BSS) may become a problem as the 5 MHz transmissions may not overlap since each BSS typically wants to center their transmissions because of spectral mask difficulties.

Exemplary Preamble Design for Coexistence

Figure 8:
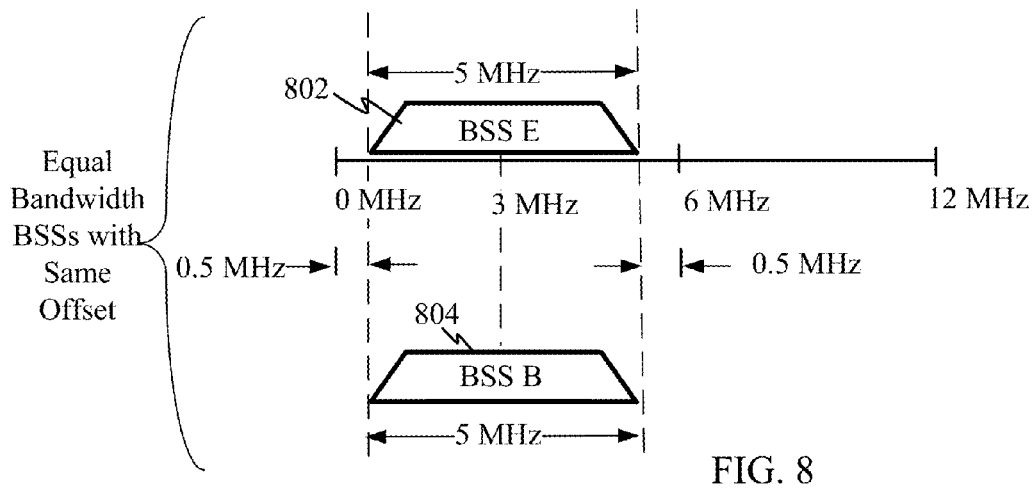
FIG. 8 illustrates the coexistence of two equal-bandwidth basic service sets (BSS) having the same guard band.

FIG. 8 illustrates the coexistence of two equal-bandwidth basic service sets (BSS) having the same guard band. In this example, a first BSS E and a second BSS B both implement 5 MHz bandwidth transmissions 802 and 804, respectively, on a 6 MHz channel. The 5 MHz transmissions 802 and 804 are centered at 3 MHz and have a guard band of 0.5 MHz on either side. Because both the first and second BSSs use the same guard band (e.g., 0.5 MHz), devices on either the first BSS E and are able to detect when a particular channel is in use by the second BSS B, and vice versa.

Figure 9:
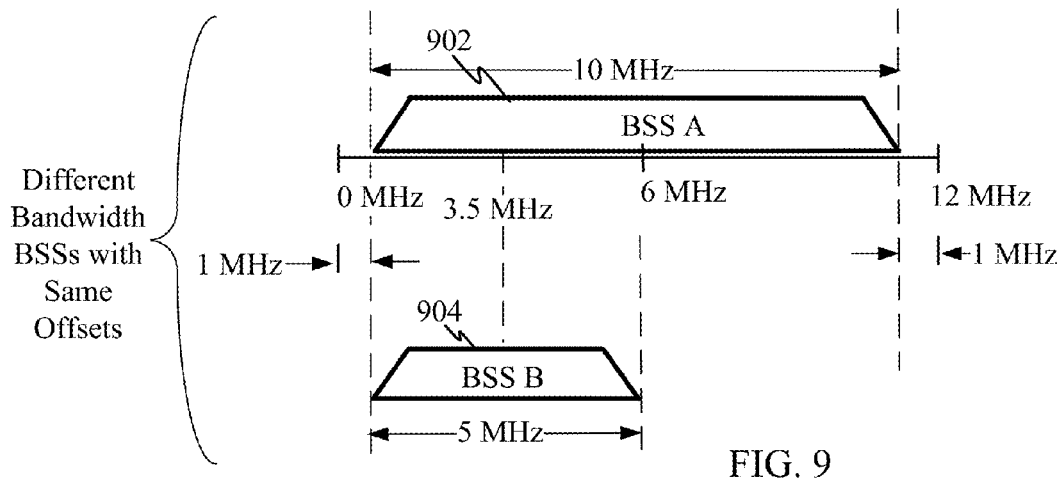
FIG. 9 illustrates the coexistence of two different-bandwidth basic service sets (BSS) having the same guard band.

FIG. 9 illustrates the coexistence of two different-bandwidth basic service sets (BSS) having the same guard band. In this example, a first BSS A implements 10 MHz bandwidth transmissions 902 over two contiguous 6 MHz channels and a second BSS B implements 5 MHz bandwidth transmissions 904 over a 6 MHz channel. The 10 MHz transmission 902 (of the first BSS A) is centered at 6 MHz (of a 12 MHz channel defined by two contiguous 6 MHz channels. Consequently, the 10 MHz transmission 902 has a 1 MHz guard band on either side. Consequently, in order to align the start of the 5 MHz transmission 904 with the 10 MHz transmission 902, the 5 MHz transmission 904 (of the second BSS B) is offset 1 MHz band from the left band edge. Having a 1 MHz guard band for both transmissions 902 and 904 allows devices in BSS A and BSS B to detect the occurrence of a transmission on the channel. However, this approach does not provide for a guard band on the right side of the 5 MHz transmission, potentially causing unacceptable spectral leakage into the adjacent 6 MHz channel (i.e., between 6 MHz and 12 MHz).

Thus, it is clear that the approaches of FIGS. 8 and 9 may not solve the OBSS co-existence problem.

Figure 10:
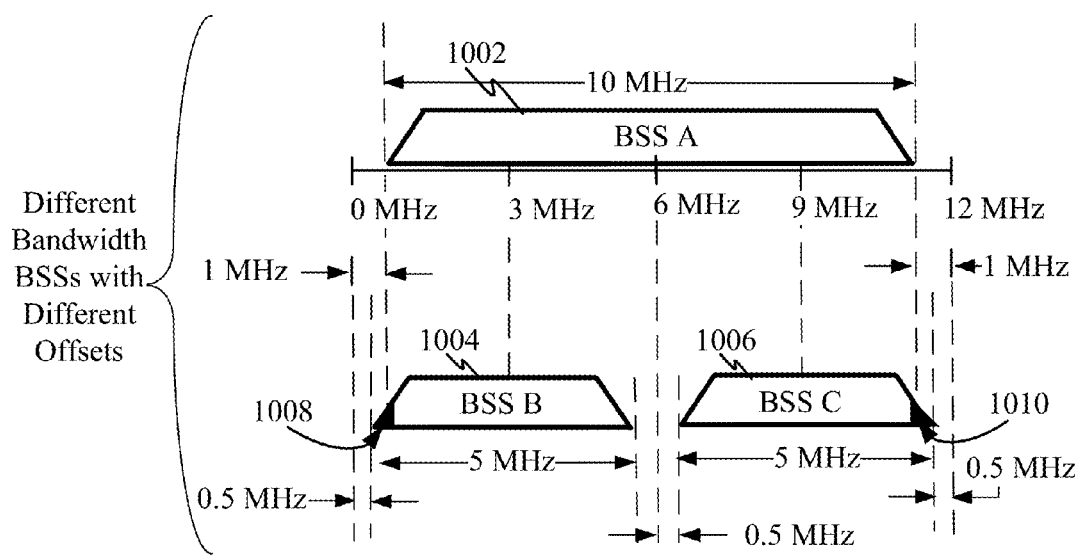
FIG. 10 illustrates the coexistence of two different-bandwidth basic service sets (BSS) having different guard bands or offsets.

FIG. 10 illustrates the coexistence of two different-bandwidth basic service sets (BSS) having different guard bands or offsets. In this example, a first BSS A may implement a 10 MHz transmission/waveform 1002 over two contiguous 6 MHz channels. A second BSS B may implement a 5 MHz bandwidth transmission/waveform 1004 over a first 6 MHz channel. Similarly, a third BSS C may implement a 5 MHz bandwidth transmission/waveform 1006 over a second 6 MHz channel.

The 10 MHz transmission/waveform 1002 is centered at 6 MHz and has a 1 MHz guard band on either side. The 5 MHz transmissions/waveforms 1004 and 1006 in the second BSS B and the third BSS C may be centered at 3 MHz and 9 MHz, respectively, and each have 0.5 MHz guard bands on either side of the respective 5 MHz transmission. Such distinct guard bands of 1 MHz for 10 MHz transmissions and 0.5 MHz for 5 MHz transmissions may cause coexistence problems as devices using a first guard band (e.g., 0.5 MHz band) may not be able to detect transmissions using a second guard band (e.g., 1 MHz band).

According to one feature, a device avoids transmitting certain information (e.g., preamble information) in non-overlapping frequency portions of a smaller-bandwidth transmission/waveform, thereby increasing the expected offset at either a leading or trailing edge. For example, the transmission/waveform 1004 in the second BSS B may avoid transmitting information bits between 0.5 MHz and 1 MHz (segment 1008), which are outside the left side of the bandwidth of the 10 MHz transmission/waveform 1002 of the first BSS A Similarly, devices operating within the third BSS C 1006 may avoid transmitting information bits between 11.0 MHz and 11.5 MHz (segment 1010), which are outside the right side of the bandwidth of the 10 MHz transmission/waveform 1002 of the first BSS A. Furthermore, the 10 MHz transmission/waveform 1002 of the first BSS A may include a legacy signal (L-SIG) of a 5 MHz packet when seen in the second BSS B and/or the third BSS C.

As can be appreciated in FIG. 10, the 10 MHz transmission/waveform 1002 in BSS A, centered at 6 MHz, has its tones misaligned with the 5 MHz transmissions/waveforms in the second BSS B 1004 and/or third BSS C 1006, centered at 3 MHz, because 3 MHz is not a multiple of tone-spacing in this design. In order to align the 10 MHz transmission/waveform 1002 in the first BSS A with the 5 MHz transmissions/waveforms 1004 and 1006 in the second BSS B and/or third BSS C, respectively, the preamble (e.g., L-SIG portion) of transmissions/waveforms in the 5 MHz BSSs (second BSS B 1004 and third BSS C 1006) are limited to the middle 4 MHz and preamble (e.g., L-SIG) transmissions in the 10 MHz first BSS 1002 may include two identical 4 MHz preambles (e.g., L-SIG portions) populated at 1 MHz and 5 MHz as well as 7 MHz and 11 MHz.

Figure 11:
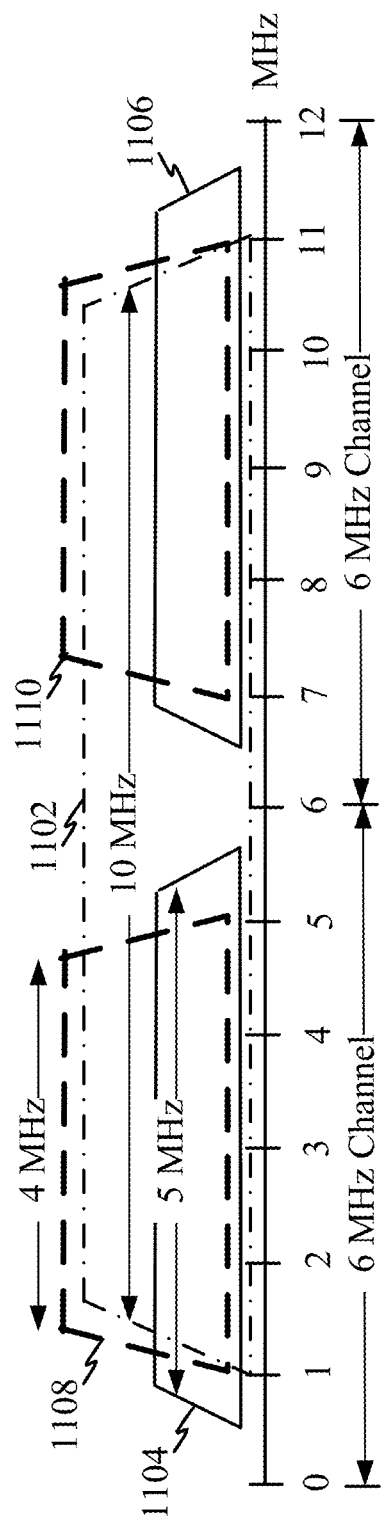
FIG. 11 illustrates channel use for 5 MHz and 10 MHz transmissions/waveforms according to certain aspects of the present disclosure.

FIG. 11 illustrates channel use for 5 MHz and 10 MHz transmissions/waveforms according to certain aspects of the present disclosure. In order for devices to coexist in a frequency spectrum (e.g., television white space) while using transmissions/waveforms having two (or more) different bandwidths, the preambles of all transmissions may be limited to the middle portion 1108 and 1110 of the smallest bandwidth transmission (e.g., 5 MHz transmission 1104 or 1106) that overlaps with the largest bandwidth transmission (e.g., 10 MHz transmission 1102). In this example, 6 MHz television whitespace channels are defined but data transmissions/waveforms (for a local wireless data network) may span 5 MHz (waveforms/transmissions 1104 and 1106) and 10 MHz (waveform/transmission 1102). In order to transmit a 5 MHz WLAN signal 1104 and/or 1106, a transmitter may transmit the waveform with the carrier frequency set to the middle of the 6 MHz channel. For the 10 MHz transmission/waveform 1102, two adjacent channels may be used and the carrier frequency used may be the center of the 12 MHz channel by the two adjacent 6 MHz channels.

Both the 5 MHz transmissions/waveforms 1104 and/or 1106 and 10 MHz transmission/waveform 1102 may use the 4 MHz segments 1108 and 1110 of the channels, in the frequency domain, to transmit at least a portion of an identifying preamble (e.g., L-SIG). For 10 MHz transmissions/waveforms 1102, two 4 MHz transmissions centered at 3 MHz and 9 MHz, respectively, may be used. In one example, the portion of an identifying preamble transmitted in the 4 MHz segments 1108 and 1110 may simply identify a duration for the corresponding transmission/waveform.

According to one example, transmissions/waveforms may be constructed digitally up to a legacy section of the preamble. For instance, a multi-carrier legacy part of the preamble may be sent, where a digitally constructed or a multi-carrier Request to Send frame (RTS)—Clear to Send frame (CTS) may be used for coexistence before every packet with two replicas of a 4 MHz RTS-CTS which are centered at 3 and 9 MHz for 10 MHz transmissions/waveforms. According to certain aspects, a complete (preamble and data) 5 MHz multi-carrier design may be designed (with two separate 5 MHz channels used to achieve 10 MHz. Thus, a single carrier transmission of 10 MHz bandwidth waveforms and 20 MHz bandwidth waveforms may not be allowed.

Figure 12:
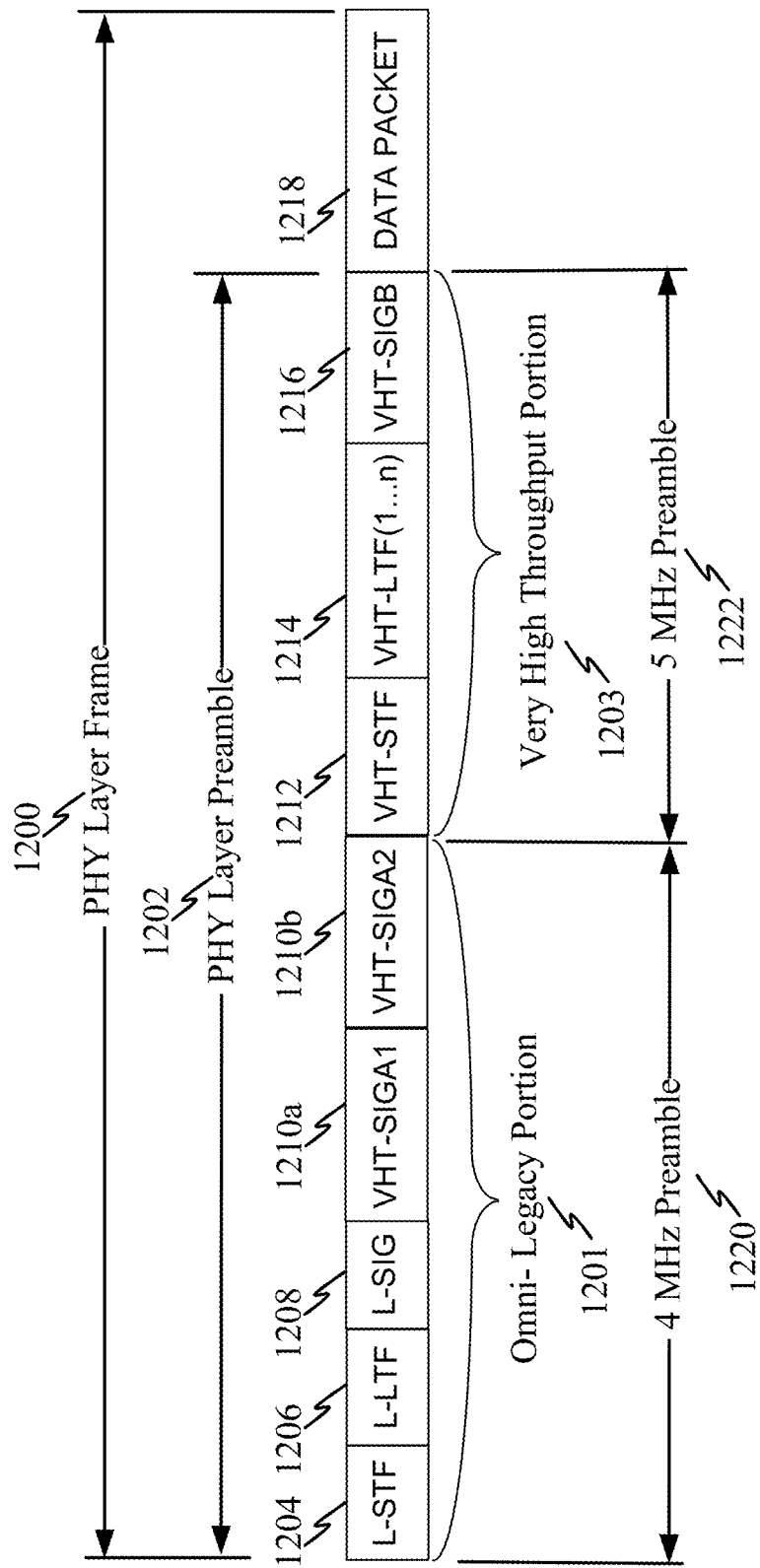
FIG. 12 illustrates an example structure of a physical layer frame including preamble portion in accordance with certain aspects of the present disclosure.

FIG. 12 illustrates an example structure of a physical layer frame 1200 including preamble portion 1202 in accordance with certain aspects of the present disclosure. The preamble 1202 may be transmitted in accordance with IEEE 802.11 family of wireless communications standards (e.g., in accordance with the VHT standard) in a wireless network. The preamble 1202 may include an omni-legacy portion 1201 and a pre-code Very High Throughput (VHT) portion 1203. The legacy portion 1201 may include at least one of: a Legacy Short Training Field (L-STF) 1204, a Legacy Long Training Field 1206, a Legacy Signal (L-SIG) field 1208, and/or two Very High Throughput (VHT) Signal (SIG) fields type A (VHT-SIG-A fields). The omni-legacy portion 1201 may be associated with a 4 MHz preamble 1220. The pre-coded VHT portion 1203 may comprise at least one of: a Very High Throughput Short Training Field (VHT-STF) 1212, one or more Very High Throughput Long Training Fields (VHT-LTF (1 . . . n)) 1214, a Very High Throughput Signal Field type B (VHT-SIG-B field) 1216, and/or a data packet 1218.

In one example, the preamble fields in the omni-legacy portion 1201 are transmitted in the 4 MHz segment 1108/1110 (FIG. 11) while the remaining portion of the frame 1200 is transmitted over the 5 MHz preamble 1222. This permits receivers to detect the legacy portion of the preambles for both 5 MHz and 10 MHz transmissions/waveforms.

For example, every 5 MHz transmission/waveform 1104/1106 (FIG. 11) may include a PHY layer frame 1200. The PHY layer frame 1200 includes a preamble that spans the middle 4 MHz of a 6 MHz television channel. For example, just the omni-legacy portion 1201 may be included in the middle 4 MHz, which includes the L-SIG field 1208 and/or VHT-SIGA1/VHT-SIGA2 fields 1210a/1210b, containing frame duration information. The L-SIG field 1210a and 1210b may include two symbols (SIGA1, SIGA2) where the information bits are populated (e.g., modulated or coded) in the tones indexed at −45 to +45, excluding the pilot tones and DC tones (in general 4 pilot tones and 3 DC tones indexed −1,0,1).

Similarly, every 10 MHz transmission/waveform 1102 may transmit its PHY layer frame preceded with a preamble duplicated across two identical 4 MHz segments (e.g., 4 MHz segments 1108 and 1110 in FIG. 11) so that the L-SIG field 1208 and/or VHT-SIGA1/VHT-SIGA2 fields 1210a/1210b of the preamble 1202 is centered at 3 and 9 MHz. Digital processing may be used to construct such a waveform as follows.

In one example, to generate the VHT-SIGA fields 1210a and 1210b for the left 4 MHz segment 1108 (FIG. 11) of the preamble, a device may populate the designated data tones between −128 and −1 with the VHT-SIGA fields 1210a and 1210b in the same way that a 5 MHz device would populate tones −64 to 63. Next, the device may populate tones 0 to 127 with zeros. The device may take a 256 point IFFT of the above construction to generate time domain samples, multiply each time domain sample with $\exp(-j*2pi*500e-6*t(i))$ where $t(-128)=0$ and $t(i+1)=t(i)+(32-6.4)/256$ μseconds, and store the time domain samples.

In another example, to generate the VHT-SIGA fields 1210a and 1210b for the right 4 MHz segment 1110 of the preamble, the device may populate the designated data tones between 0 and 127 with VHT-SIGA fields 1210a and 1210b in the same way that a 5 MHz device may populate tones −64 to 63 when generating the preamble. The device may populate tones −128 to −1 with zeros, take a 256 point IFFT of the above construction to generate time domain samples, multiply each time domain sample with $\exp(+j*2pi*500e-6*t(i))$ where $t(-128)=0$ and $t(i+1)=t(i)+(32-6.4)/128$ μseconds, and store the time domain samples.

Adding the time domain samples generated for the left and right 4 MHz segments 1108 and 1110 of the preamble may generate the time domain samples of the preamble.

Figure 13:
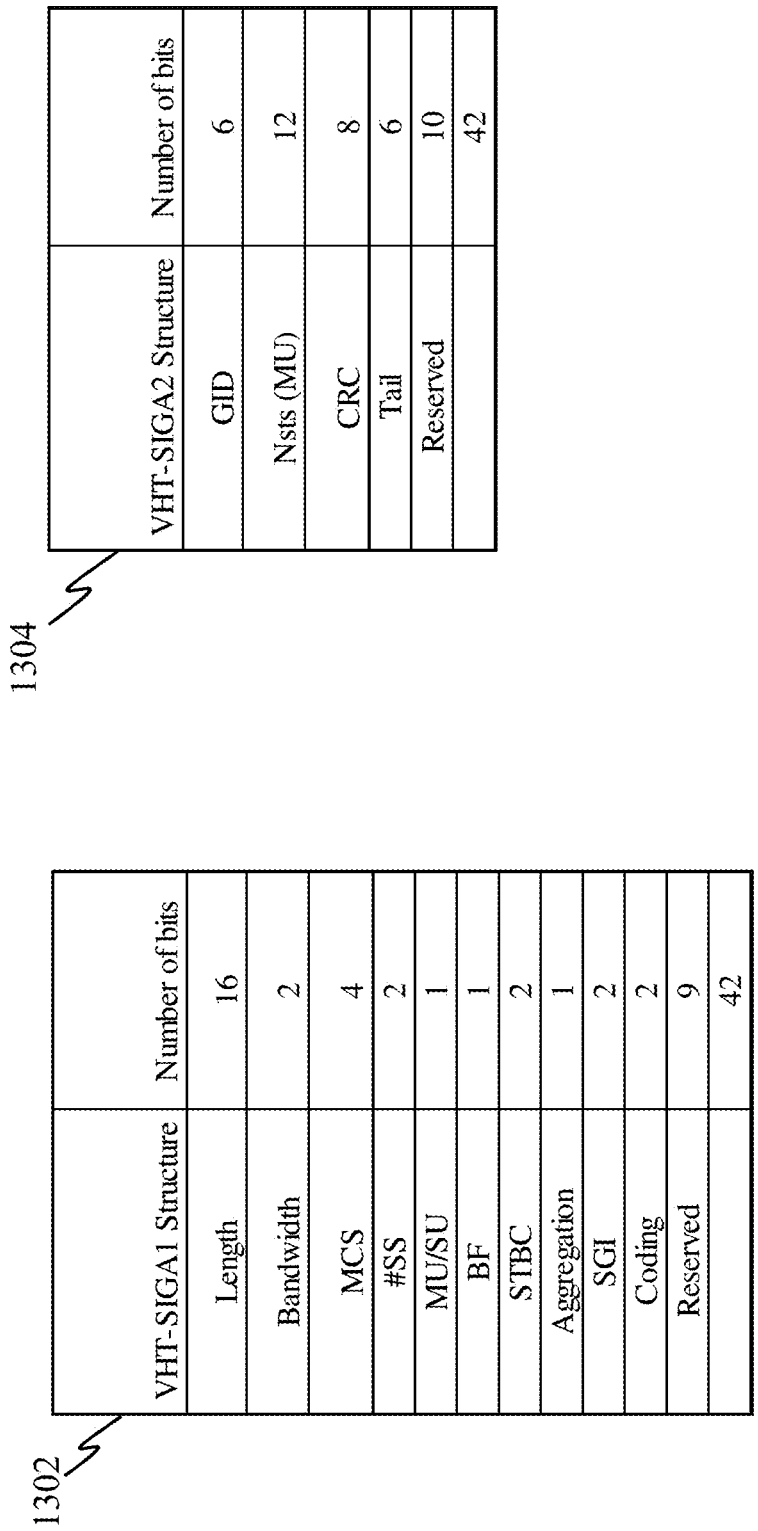
FIG. 13 illustrates an exemplary designation of the signal (SIG) field bits for VHT-SIGA1 and VHT-SIGA2 structures in a preamble.

FIG. 13 illustrates an exemplary designation of the signal (SIG) field bits for VHT-SIGA1 and VHT-SIGA2 structures in a preamble. Field VHT-SIGA1 1302 may carry information similar to an IEEE 802.11n standard field HT-SIG, and VHT-SIGA2 1304 may carry information necessary for multi-user multiple-input and multiple-output (MU-MIMO) Importantly, in the IEEE 8011 standards define that the VHT-SIGA fields 1210a and 1210b are represented by two OFDM symbols. However, because of the downclocking of the waveform previously described, the number of sub-carriers may be increased, thereby allowing the VHT-SIGA fields 1210a and 1210b to be encoded into a single OFDM symbol (instead of two OFDM symbols).

Figure 23:
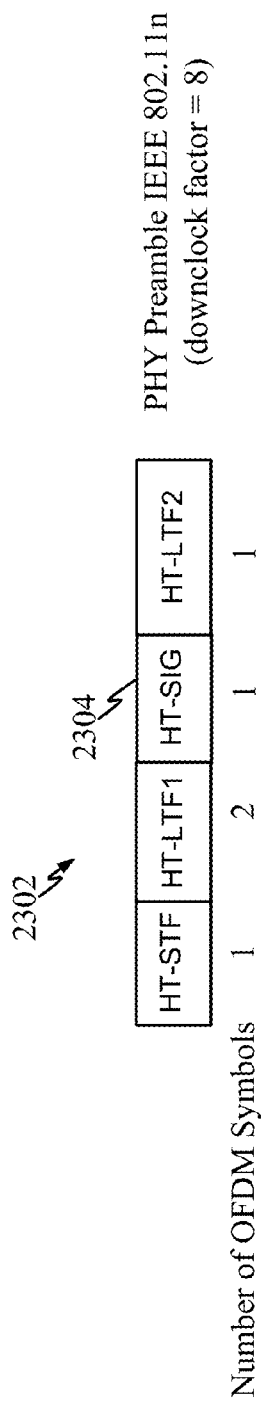
FIG. 23 illustrates an exemplary preamble portion of an IEEE 802.11n compatible frame in which the HT-SIG field 2304 is represented in a single OFDM symbol.

FIG. 23 illustrates an exemplary preamble portion 2302 of an IEEE 802.11n compatible frame in which the HT-SIG field 2304 is represented in a single OFDM symbol. This may be accomplished by utilizing the 108 data tones (sub-carriers) in a 6 MHz waveform obtained by down-clocking an IEEE 802.11n 40 MHz waveform.

Figure 24:
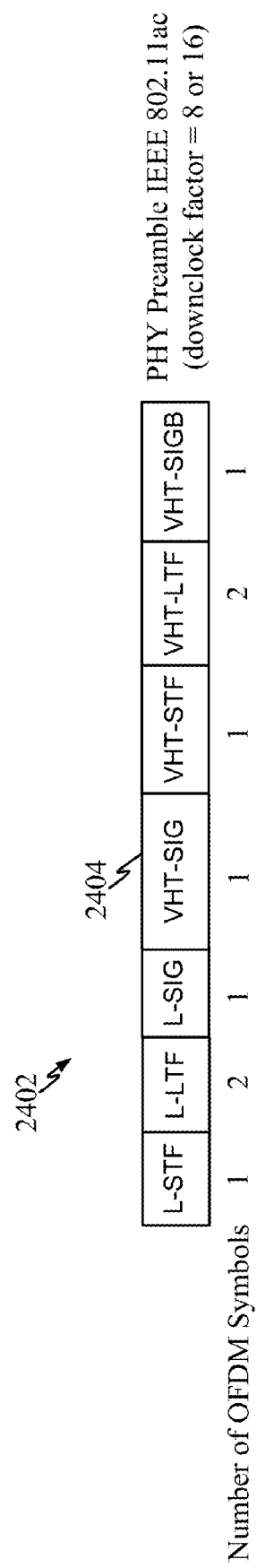
FIG. 24 illustrates an exemplary preamble portion of an IEEE 802.11ac compatible frame in which the VHT-SIG field is represented in a single OFDM symbol.

FIG. 24 illustrates an exemplary preamble portion 2402 of an IEEE 802.11ac compatible frame in which the VHT-SIG field 2404 is represented in a single OFDM symbol. This may be accomplished by utilizing the 108 data tones (sub-carriers) in a 6 MHz waveform obtained by down-clocking an IEEE 802.11 ac 40 MHz waveform using a factor of 8. In yet another aspect, contents of an IEEE 802.11ac VHT-SIGA field in a single OFDM symbol may be accommodated by utilizing the 234 data tones in a 6 MHz waveform obtained by down clocking an IEEE 802.11ac 80 MHz waveform using a factor of 16.

A receiving device may perform corresponding, counterpart operations to decode and process received transmissions/waveforms. For example, while receiving a Physical layer frame 1200 (e.g., also referred to as a Protocol Data Unit (PPDU)), a 10 MHz receiving device may correctly frequency shift the received signal until the end of the VHT-SIGA field (e.g., until the end of VHT-SIGA2 field 1210b) by performing counter frequency shifting operations. The direction of the frequency shift may depend on which of the 5 MHz halves (segment 1108 or segment 1110) of the 10 MHz channel is designated as the primary half.

For example, if the left half (e.g., segment 1108) of the 10 MHz transmission 1102 is designated as primary half, the receiving device may shift the received signal by −500 Hz. The shift may be obtained by applying a time domain phase ramp function before the fast Fourier Transform (FFT). Once the 256 point FFT is applied the frequency domain samples on the tones from 0 to 127 may be discarded, and only the tones from −128 to −1 may be used to extract the VHT-SIGA fields.

By using a 4 MHz preamble with each frame, both 5 MHz and 10 MHz devices may decode the 4 MHz preamble portion 1108 and 1110. The 4 MHz preamble information carries length information for the frame (i.e., PHY layer PDU) and may be used by the receiving device to defer for the duration of the transmission.

Exemplary Transmitter Device Adapted for Coexistence in White Space TV Channels

Figure 14:
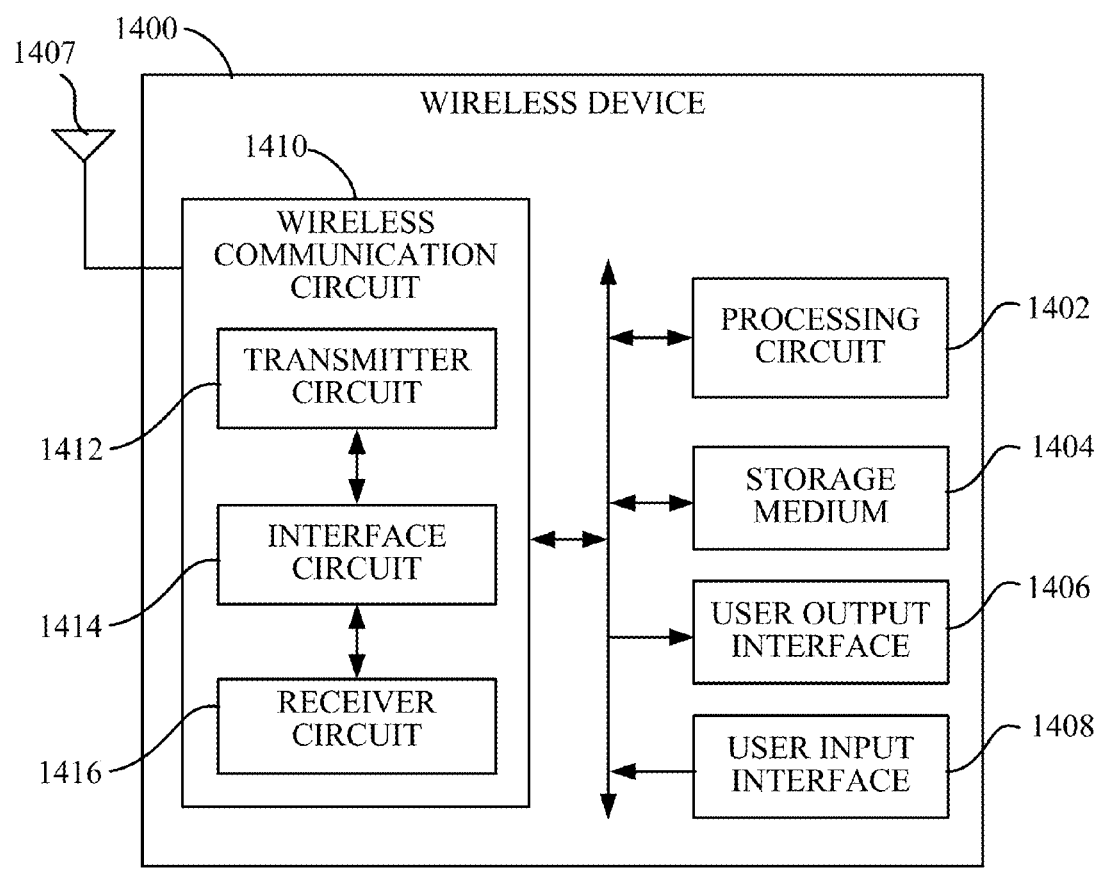
FIG. 14 is a block diagram illustrating an exemplary wireless device that may be adapted for communications over a television white space (unused) channel.

FIG. 14 is a block diagram illustrating an exemplary wireless device that may be adapted for communications over a television white space (unused) channel. The wireless device 1400 may include a processing circuit 1402 coupled to a storage medium 1404 (e.g., memory device, memory card, non-volatile storage, etc.), a user output interface 1406 (e.g., display, speaker, etc.), a user input interface 1408 (e.g., microphone, keypad, etc.), and/or a wireless communication circuit 1410. The processing circuit 1402 may be adapted to perform certain operations of the wireless device, including running applications, web browsers, phone call operations, etc. The wireless communication circuit 1410 may include a transmitter circuit 1412 and a receiver circuit 1416 coupled to an interface circuit 1414.

The transmitter circuit 1412 and/or interface circuit 1414 may include a transmitter chain and may be adapted to perform transmission operations by receiving data from the processing circuit 1402, modulating the data into a number of sub-carriers (tones/frequencies) that form a waveform, and modulating the waveform into a primary carrier frequency for transmission over an unused television channel (i.e., tv white space). In modulating the date into a number of sub-carriers to form the waveform, a downclocking factor may be applied to a clock for a transmitter chain, causing the clock frequency into components of the transmitter chain to be slowed down according to the downclocking factor. By slowing the clock from a first frequency to a second frequency, the bandwidth is also reduced (relative to the bandwidth provided by the original clock) from a first bandwidth (e.g., corresponding to the original clock) to a second bandwidth (e.g., corresponding to the downclocked/slowed clock). However, to compensate for the reduced bandwidth, one aspect also increases the sub-carriers used, thereby retaining the effective data throughput. More specifically, for different bandwidths, the sub-carriers are increased such that the symbol duration remains constant.

The receiver circuit 1416 and/or interface circuit 1414 may include a receiver chain and may be adapted to perform reception operations by receiving a waveform from the antenna 1407, demodulating the waveform to a baseband waveform, and demodulating upclocked waveform to obtain the data therein.

Note that downclocking the waveform permits reusing a legacy transmitter/receiver chain circuit design by merely applying a downclocking factor to clock. For instance, an existing 20 MHz clock may be used to generate a 20 MHz waveform which is subsequently downclocked prior to transmission. However, to compensate for the reduced bandwidth and to keep symbol duration constant for all bandwidths (e.g., to permit coexistence of transmissions/waveforms having different bandwidths), the number of carriers may be adjusted for waveforms of different bandwidths.

Figure 15:
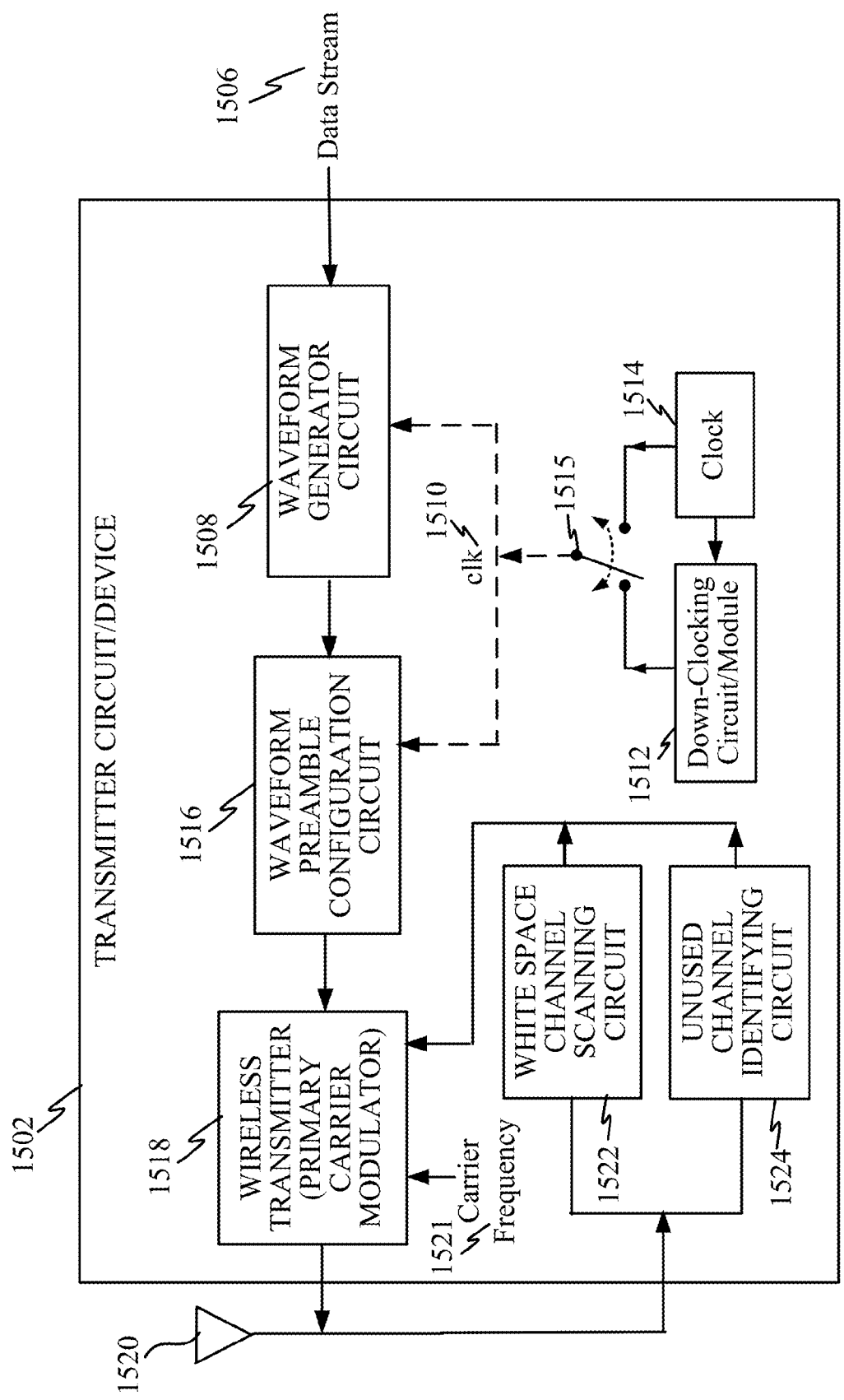
FIG. 15 is a block diagram illustrating an exemplary transmitter circuit/device that may be adapted to transmit over a television white space channel.

FIG. 15 is a block diagram illustrating an exemplary transmitter circuit/device 1502 that may be adapted to transmit over a television white space channel. A waveform generator 1508 uses a clock signal (clk) 1510 to modulate a data stream 1506 into a number of sub-carriers (tones/frequencies) to generate a waveform having a first bandwidth. The transmitter circuit/device 1502 may be adapted to dynamically adjust its transmissions for different bandwidths, waveform types, and/or available channels. For example, the waveform generator 1508 may be adapted to generate waveforms based on the IEEE 802.11n and/or 802.11ac specifications. However, the transmitter circuit/device 1502 may also be adapted to transmit over unused television channels (e.g., whitespace). As such, it may be adapted to configure waveforms to fit within the bandwidth available in an unused television channel. Consequently, a downclocking circuit/module 1512 may serve to adjust a waveform bandwidth. For example, such downclocking circuit 1512 may obtain a clock 1514 and reduce its frequency according to a factor. This downclocked clock is then provided to the transmitter chain (e.g., waveform generator 1508). A switch 1515 may allow the transmitter circuit 1502 to dynamically select the clk signal 1510 from the original clock 1514 or from the downclocking circuit 1512. Downclocking changes the waveform bandwidth from a first bandwidth (e.g., if the original clock 1514 had been used) to a second bandwidth (e.g., using the downclocking circuit 1512). A waveform preamble configuration circuit 1516 may then generate a preamble and appends it to the downclocked waveform. A wireless transmitter 1518 (e.g., primary carrier modulator) may then modulate the downclocked waveform onto a primary carrier frequency 1521 for transmission over an antenna 1520.

In one example, the primary carrier frequency 1521 may correspond to an unused television channel (e.g., white space). In this example, the transmitter circuit 1502 may include a white space channel scanning circuit 1522 and/or an unused channel identifying circuit 1524. The white space channel scanning circuit 1522 may scan a frequency spectrum (e.g., television frequency spectrum) to identify channels not in use (e.g., by monitoring for energy in the channels). Alternatively, the unused channel identifying circuit 1524 may query an external database to ascertain which television channels are unused in a particular region.

In one example, the channel identifier (e.g., 1522/1524) may be adapted to identify an unused channel within a television broadcast frequency spectrum. The waveform generator 1508 may be adapted to generate a downclocked waveform by applying a factor to a clock that causes a waveform bandwidth to be reduced from a first bandwidth to a second bandwidth, wherein the second bandwidth of the downclocked waveform is less than a channel bandwidth for the identified unused channel. The preamble configuration circuit 1516 may be adapted to configure the downclocked waveform so that it coexists with a larger waveform having a third bandwidth that is greater than the channel bandwidth. The wireless transmitter 1518 may be adapted to wirelessly transmit the downclocked waveform over the identified unused channel. The waveform generator 1508 may be further adapted to increase a cyclic prefix duration and symbol duration for a symbol within the downclocked waveform relative to a waveform generated using the clock and spanning the first bandwidth. The downclocked waveform and the larger waveform may have the same fixed symbol duration. The downclocked waveform may have a first guard band that is different than a second guard band for the larger waveform, a guard band defining an unused frequency space between an edge of the unused channel and a corresponding edge of the downclocked waveform. The downclocked waveform may be defined in accordance with one or more standards of the Institute of Electronics and Electrical Engineers (IEEE) 802.11 family of standards. The downclocking factor may be dynamically selected from a set of factors that includes two or more of: 4, 5, 6.66, 8, and 10. The television broadcast frequency spectrum is pre-divided into a plurality of channels of equal bandwidth and the unused channel is selected and repurposed for data transmissions from among the plurality of channels. The preamble configuration circuit 1516 may be further adapted to identify an overlapping frequency region between the downclocked waveform and the larger waveform, wherein the downclocked waveform and the overlapping frequency region have the same center frequency and the overlapping frequency region has a fourth bandwidth. The wireless transmitter 1518 and/or waveform preamble configuration circuit 1516 may be further adapted to: (a) transmit a first portion of a preamble for the downclocked waveform over the fourth bandwidth of the overlapping region; and/or (b) transmit a second portion of the preamble over the full second bandwidth of the downclocked waveform. The wireless transmitter 1518 and/or waveform generator 1508 may be further adapted to transmit an orthogonal frequency-division multiplexing (OFDM) symbol over the full second bandwidth of the downclocked waveform. In another example, the wireless transmitter 1518 and/or waveform preamble configuration circuit 1516 may be further adapted to generate a preamble for the downclocked waveform, the preamble including: (a) a first preamble portion encoded within a fourth bandwidth of the downclocked waveform, where the fourth bandwidth is smaller than the second bandwidth; and/or (b) a second preamble portion encoded over the full second bandwidth of the downclocked waveform.

Figure 16:
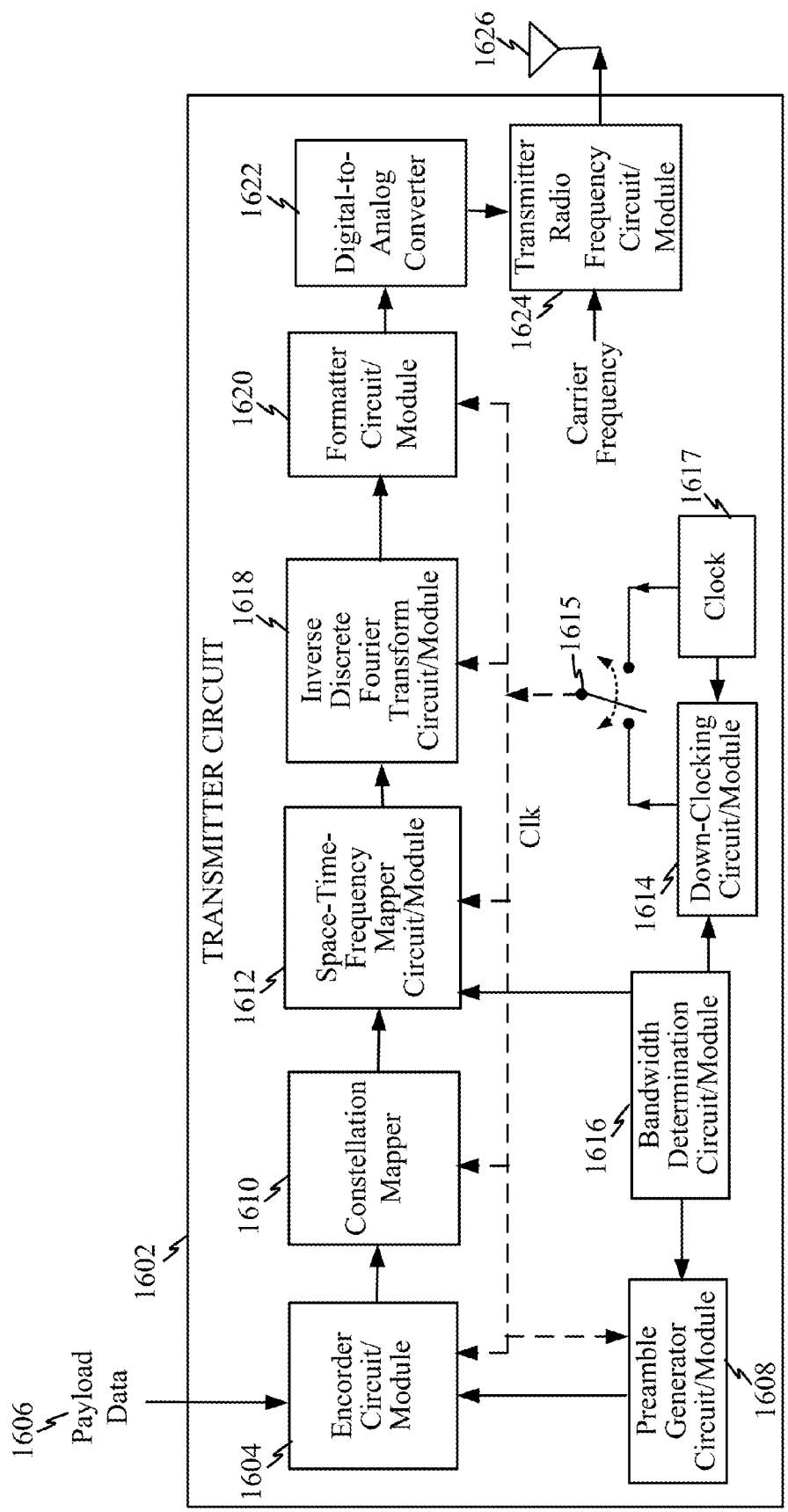
FIG. 16 is a block diagram illustrating one configuration of a transmitter circuit in which systems and methods for downclocking a waveform and generating frame preambles for coexistence in a television unused channel may be implemented.

FIG. 16 is a block diagram illustrating one configuration of a transmitter circuit 1602 in which systems and methods for downclocking a waveform and generating frame preambles for coexistence in a television unused channel may be implemented. The transmitter circuit 1602 may be an example of the transmitter circuit 1412 of FIG. 14. The transmitter circuit 1602 may include an encoder 1604 with an input for receiving payload data 1606 and/or preamble data 1608 to be transmitted to one or more receiving communication devices. The payload data 1606 may include voice, video, audio and/or other data. The preamble data 1608 may include control information, such as information that specifies a data rate, modulation and coding scheme (MCS), channel bandwidth, etc. The encoder 1604 may encode data for forward error correction (FEC), encryption, packeting and/or other encodings known for use with wireless transmission.

A constellation mapper 1610 maps the data provided by the encoder 1604 into constellations. For instance, the constellation mapper 1610 may use modulation schemes such as binary phase-shift keying (BPSK), quadrature amplitude modulation (QAM), etc. Where quadrature-amplitude modulation (QAM) is used, for example, the constellation mapper 1610 may provide two bits per spatial stream, per data subcarrier, per symbol period. Furthermore, the constellation mapper 1610 may output a 16-QAM constellation signal for each spatial stream for each data subcarrier for each symbol period. Other modulations may be used, such as 64-QAM, which would result in a consumption of six bits per spatial stream, per data subcarrier, per symbol period. Other variations are also possible.

The output of the constellation mapper 1610 is provided to a space-time-frequency mapper 1612 that maps the data onto Spatial-Time-Frequency (STF) dimensions of the transmitter. The dimensions represent various constructs or resources that allow for data to be allocated. A given bit or set of bits (e.g., a grouping of bits, a set of bits that correspond to a constellation point, etc.) may be mapped to a particular place among the dimensions. In general, bits and/or signals mapped to different places among the dimensions are transmitted from the transmitter circuit 1602 such that they are expected to be, with some probability, differentiable at one or more receiving communication devices. In one configuration, the space-time-frequency mapper 1612 may perform space-time block coding (STBC).

One or more spatial streams may be transmitted from the transmitter circuit 1602 such that the transmissions on different spatial streams may be differentiable at a receiver (with some probability). For example, bits mapped to one spatial dimension are transmitted as one spatial stream. That spatial stream may be transmitted on its own antenna spatially separate from other antennas, its own orthogonal superposition over a plurality of spatially-separated antennas, its own polarization, etc. Many techniques for spatial stream separation (involving separating antennas in space or other techniques that would allow their signals to be distinguished at a receiver, for example) are known and can be used.

In the case that the transmitter circuit 1602 uses a plurality of frequency subcarriers, there are multiple values for the frequency dimension, such that the space-time-frequency mapper 1612 may map some bits to one frequency subcarrier and other bits to another frequency subcarrier. Other frequency subcarriers may be reserved as guard bands, pilot tone subcarriers, or the like that do not (or do not always) carry data. For example, there may be one or more data subcarriers and one or more pilot subcarriers. It should be noted that, in some instances or configurations, not all subcarriers may be excited at once. For instance, some tones may not be excited to enable filtering. In one configuration, the transmitter circuit 1602 may utilize orthogonal frequency-division multiplexing (OFDM) for the transmission of multiple subcarriers. For instance, the space-time-frequency mapper 1612 may map (encoded) data 1606 to space, time and/or frequency resources according to the multiplexing scheme used.

The time dimension refers to symbol periods. Different bits may be allocated to different symbol periods. Where there are multiple spatial streams, multiple subcarriers and/or multiple symbol periods, the transmission for one symbol period may be referred to as an OFDM (orthogonal frequency-division multiplexing) MIMO (multiple-input, multiple-output) symbol. A transmission rate for encoded data may be determined by multiplying the number of bits per simple symbol (e.g., log.sub.2 of the number of constellations used) times the number of spatial streams times the number of data subcarriers, divided by the length of the symbol period. Thus, the space-time-frequency mapper 1612 may map bits (or other units of input data) to one or more spatial streams, data subcarriers and/or symbol periods. Separate spatial streams may be generated and/or transmitted using separate paths. In some implementations, these paths are implemented with distinct hardware, whereas in other implementations, the path hardware is reused for more than one spatial stream or the path logic is implemented in software that executes for one or more spatial streams. More specifically, each of the elements illustrated in the transmitter circuit 1602 may be implemented as a single block/module or as multiple blocks/modules. The output(s) of the space-time-frequency mapper 1612 may be spread over frequency and/or spatial dimensions.

The transmitter circuit 1602 may include a switch 1615 and may be adapted to dynamically select between a clock 1617 and/or a downclocked version of the clock 1617. In particular, a downclocking circuit/module 1614 may apply a fixed factor to the clock 1617, thereby reducing the frequency of the clock 1617. The selected clock signal (Clk) is provided to one or more components of the transmitter chain (e.g., encoder circuit 1604, constellation mapper 1610, space-time-frequency mapper 1612, inverse discrete Fourier Transform 1618, and/or formatter 1620). Reduction in clock frequency by downclocking results in a reduction of the waveform bandwidth from a first bandwidth (e.g., if the frequency of the clock 1617 had been used) to a second bandwidth (using the frequency of the downclocking circuit 1614).

The transmitter circuit 1602 may also include a bandwidth determination block/module 1616. The bandwidth determination block/module 1616 may determine channel bandwidth to be used for transmissions to one or more receiving communication devices. This determination may be based on one or more factors, such as receiving communication device compatibility, channel quality, unused channel(s) in television frequency spectrum, etc. In one configuration, the bandwidth determination block/module 1616 may determine whether the bandwidth for signal transmission is 5 MHz, 10 MHz, etc. The bandwidth determination circuit/module 1616 may provide a bandwidth indication to the space-time-frequency mapper 1612, the down-clocking circuit/module 1614 and/or the preamble generator circuit/module 1608. Additionally or alternatively, the bandwidth indication may be provided as part of preamble data where one or more bits in the preamble may be allocated to represent the bandwidth indication.

The space-time-frequency mapper 1612 may use the bandwidth indication to map the preamble data to a number of tones (e.g., subcarriers). For example, the systems and methods disclosed herein may define a number of OFDM tones or subcarriers that may be used by the transmitter circuit 1602 for the transmission of preamble data based on the channel bandwidth (as specified by the bandwidth indication, for example). The number of OFDM tones may also be specified according to a particular preamble field. For example, the space-time-frequency mapper 1612 may map preamble data to a number of OFDM tones based on the bandwidth determination and the preamble field.

The waveform from the space-time-frequency mapper circuit/module 1612 may be provided to an inverse discrete Fourier transform (IDFT) circuit/module 1618. The inverse discrete Fourier transform (IDFT) circuit/module 1618 may convert the frequency-domain waveform into time domain signals representing the downclocked waveform over one or more spatial streams and/or time-domain samples for a symbol period. In one configuration, for example, the IDFT circuit/module 120 may perform a 128-point and/or 256-point inverse fast Fourier transform (IFFT).

The time-domain downclocked waveform may then be provided to a formatter 1620. The formatter 1620 may take the output of the inverse discrete Fourier transform (IDFT) circuit/module 1618, convert it from parallel signals to serial (P/S), add a cyclical prefix and/or perform guard interval windowing, etc.

The formatter 1620 output may be provided to a digital-to-analog converter (DAC) 1622. The digital-to-analog converter (DAC) 1622 may convert the formatter 1620 output from one or more digital signals to one or more analog signals. The digital-to-analog converter (DAC) 1622 may provide the analog signal(s) to one or more transmitter radio-frequency (TX RF) circuits/module 1624.

The transmitter radio frequency circuit/module 1624 may be coupled to or include a power amplifier. The power amplifier may amplify the analog signal(s) for transmission. The transmitter radio frequency circuit/module 1624 may output radio-frequency (RF) signals to one or more antennas 1626, thereby transmitting the data 1606 that was input to the encoder 1604 over a wireless medium suitably configured for receipt by one or more receiving communication devices.

One or more receiving communication devices may receive and use signals from the transmitter circuit 1602. For example, a receiving communication device may use a received bandwidth indicator to receive a given number of OFDM tones or subcarriers.

The transmitter circuits 1412/1602 and/or wireless device 1502 may be adapted to perform one or more features illustrated in FIGS. 2-13, 17-18, and/or 23/24.

Figure 17:
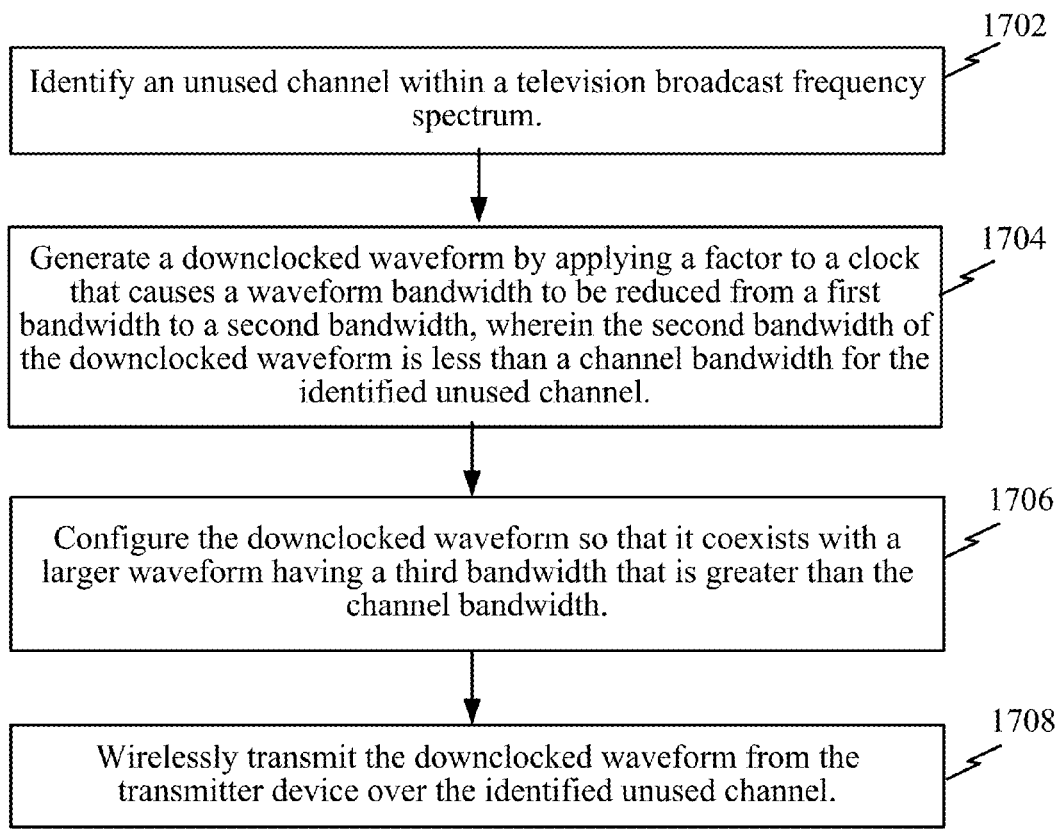
FIG. 17 is a flow diagram illustrating an exemplary method for transmitting data over a television white space channel.

FIG. 17 is a flow diagram illustrating an exemplary method for transmitting data over a television white space channel. This method may be implemented by a transmitter device/circuit as disclosed herein. A transmitter device may identify an unused channel within a television broadcast frequency spectrum 1702. The television broadcast frequency spectrum may be pre-divided into a plurality of channels of equal bandwidth and the unused channel is selected and repurposed for data transmissions from among the plurality of channels. In one example, the transmitter device may ascertain whether a channel is in use by scanning channels for a signal identifier occurring within an overlapping frequency region between the downclocked waveform and larger waveform, wherein the downclocked waveform and overlapping frequency region have the same center frequency and the overlapping frequency region has a fourth bandwidth. In another example, identifying the unused channel includes at least one of: (a) querying a remote database to ascertain unused television channels for a particular region; and/or (b) listening on one or more channels to ascertain the energy in such channels, and selecting the channel with the least amount of energy.

The transmitter device may then generate a downclocked waveform by applying a factor to a clock that causes a waveform bandwidth to be reduced from a first bandwidth to a second bandwidth, wherein the second bandwidth of the downclocked waveform is less than a channel bandwidth for the identified unused channel 1704. In one example, generating the downclocked waveform may further comprise increasing a cyclic prefix duration and symbol duration for a symbol within the downclocked waveform relative to a waveform generated using the clock and spanning the first bandwidth. The downclocked waveform is defined in accordance with one or more standards of the Institute of Electronics and Electrical Engineers (IEEE) 802.11 family of standards. The factor may be dynamically selected from a set of factors that includes two or more of: 4, 5, 6.66, 8, and 10. The factor may be dynamically selected based on an operating location of the transmitter device.

The downclocked waveform may be configured so that it coexists with a larger waveform having a third bandwidth that is greater than the channel bandwidth 1706. For example, the downclocked waveform and the larger waveform may have the same fixed symbol duration. The downclocked waveform may also have a first guard band that is different than a second guard band for the larger waveform, a guard band defining an unused frequency space between an edge of the unused channel and a corresponding edge of the downclocked waveform. The larger waveform may be transmitted over a plurality of contiguous unused channels.

In one example, configuring the downclocked waveform may include identifying an overlapping frequency region between the downclocked waveform and the larger waveform, wherein the downclocked waveform and the overlapping frequency region have the same center frequency and the overlapping frequency region has a fourth bandwidth. A first portion of a preamble for the downclocked waveform may then be transmitted/encoded over the fourth bandwidth of the overlapping region. A second portion of the preamble may be transmitted/encoded over the full second bandwidth of the downclocked waveform. In one example, an orthogonal frequency-division multiplexing (OFDM) symbol may be transmitted over the full second bandwidth of the downclocked waveform.

In another example, a preamble for the downclocked waveform may be generated, wherein the preamble includes: (a) a first preamble portion encoded within a fourth bandwidth of the downclocked waveform, where the fourth bandwidth is smaller than the second bandwidth; and/or (b) a second preamble portion encoded over the full second bandwidth of the downclocked waveform. The first preamble portion may include a duration indictor for the downclocked waveform.

The downclocked waveform may then be wireless transmitted from the transmitter device over the identified unused channel 1708.

Figure 18:
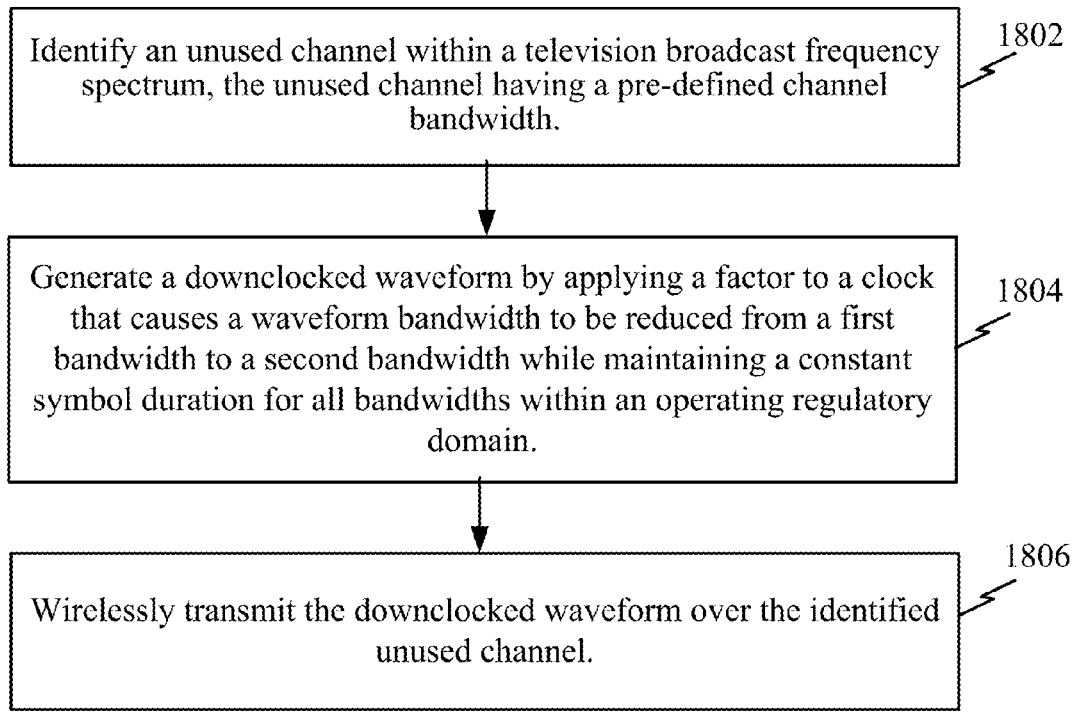
FIG. 18 is a flow diagram illustrating an exemplary method for transmitting data over a television white space channel.

FIG. 18 is a flow diagram illustrating an exemplary method for transmitting data over a television white space channel. This method may be implemented by a transmitter device/circuit as disclosed herein. A transmitter device may identify an unused channel within a television broadcast frequency spectrum, the unused channel having a pre-defined channel bandwidth 1802. The television broadcast frequency spectrum may be pre-divided into a plurality of channels of equal bandwidth and the unused channel is selected and repurposed for data transmissions from among the plurality of channels.

In one example, the second bandwidth of the downclocked waveform may be equal to the channel bandwidth.

A downclocked waveform may then be generated by applying a factor to a clock that causes a waveform bandwidth to be reduced from a first bandwidth to a second bandwidth while maintaining a constant symbol duration for all bandwidths within an operating regulatory domain 1804. The pre-defined channel bandwidth may be associated with the operating regulatory domain and varies between two different regulatory domains. The operating regulatory domain may be associated with a region and defines a wireless communication standard applied in that region. For instance, the factor may be dynamically selected from a set of factors that includes two or more of: 4, 5, 6.66, 8, and 10. Symbol duration for all bandwidths may be maintained constant by increasing a number of sub-carriers for the downclocked waveform as bandwidth is increased.

The downclocked waveform may then be transmitted over the identified unused channel 1806.

The method may further append a preamble to the downclocked waveform, the preamble including a short training field (STF).

In one example, the downclocked waveform may be one of either: (a) a 5 MHz waveform based on a 128 point inverse fast Fourier Transform (IFFT) and the short training field is created by populating every eighth tone of 117 non-guard tones as defined for an IEEE 802.11n 40 MHz compatible waveform; (b) a 5 MHz waveform based on a 128 point inverse fast Fourier Transform (IFFT) and the short training field is created by populating every eighth tone of 117 non-guard tones as defined for an IEEE 802.11n 80 MHz compatible waveform; (c) a 5 MHz waveform based on a 256 point IFFT and the short training field is created by populating every sixteenth tone of 237 non-guard tones as defined for an IEEE 802.11ac compatible 80 MHz waveform; or (d) a 5 MHz waveform based on a 256 point IFFT and the short training field is created by populating every eighth tone of 237 non-guard tones as defined for an IEEE 802.11ac 80 MHz waveform.

In another example, the downclocked waveform may be one of either: (a) a 6 MHz waveform based on a 128 point IFFT and the short training field is created by populating every eighth tone of 117 non-guard tones as defined for an IEEE 802.11n compatible 40 MHz waveform; (b) a 6 MHz waveform based on a 256 point IFFT and the short training field is created by populating every sixteenth tone of 237 non-guard tones as defined for an IEEE 802.11ac compatible 80 MHz waveform; or (c) a 6 MHz waveform based on a 256 point IFFT and the short training field is created by populating every eighth tone of 237 non-guard tones as defined for an IEEE 802.11 ac compatible 80 MHz waveform.

In another example, the downclocked waveform may be one of either: (a) an IEEE 802.11n specification high-throughput signal (HT-SIG) field in a single orthogonal frequency-division multiplexing (OFDM) symbol by utilizing 108 data tones in a 5 MHz waveform obtained by down-clocking an IEEE 802.11n compatible 40 MHz waveform; (b) an IEEE 802.11ac specification high-throughput signal (VHT-SIGA) field in a single OFDM symbol by utilizing 108 data tones in a 5 MHz waveform obtained by down-clocking a IEEE 802.11ac compatible 40 MHz waveform; or (c) an IEEE 802.11ac specification VHT-SIGA field in a single OFDM symbol by utilizing 234 data tones in a 5 MHz waveform obtained by down-clocking a IEEE 802.11ac compatible 80 MHz waveform.

In another example, the downclocked waveform may be one of either: (a) an 802.11n specification HT-SIG field in a single OFDM symbol by utilizing 108 data tones in a 6 MHz waveform obtained by down clocking a 802.11n compatible 40 MHz waveform; (b) an 802.11ac specification VHT-SIGA field in a single OFDM symbol by utilizing 108 data tones in a 6 MHz waveform obtained by down clocking a 802.11ac compatible 40 MHz waveform; or (c) an 802.11a specification VHT-SIGA field in a single OFDM symbol by utilizing the 234 data tones in a 6 MHz waveform obtained by down clocking a 802.11ac compatible 80 MHz waveform.

The methods of FIGS. 17 and 18 may be implemented with different downclocked waveforms.

In a first example, to generate 5 MHz transmissions/waveforms, the downclocked waveform may be generated based on at least one of: (a) a forty (40) MHz IEEE 802.11n specification waveform that is downclocked to a five (5) MHz bandwidth waveform and the factor is eight (8); (b) a forty (40) MHz IEEE 802.11ac specification waveform that is downclocked to a five (5) MHz bandwidth waveform and the factor is eight (8); and/or (c) an eighty (80) MHz IEEE 802.11ac specification waveform that is downclocked to a five (5) MHz bandwidth waveform and the factor is sixteen (16). This example may be useful, for example, where the available channel has a bigger bandwidth (e.g., 6 MHz channel) but spectral requirements imposed to minimize inter-channel interference may force using only a portion of the available bandwidth.

In a second example, to generate 6 MHz transmissions/waveforms, the downclocked waveform may be generated based on at least one of: (a) a forty (40) MHz IEEE 802.11n specification waveform that is downclocked to a six (6) MHz bandwidth waveform and the factor is 40/6; (b) a forty (40) MHz IEEE 802.11ac specification waveform that is downclocked to a six (6) MHz bandwidth waveform and the factor is 40/6; and/or (c) an eighty (80) MHz IEEE 802.11ac specification waveform that is downclocked to a six (6) MHz bandwidth waveform and the factor is 80/6. This example may be useful, for example, where the full bandwidth of the available channel (e.g., 6 MHz channel) may be utilized. For instance, where a mask is pre-applied to a transmission/waveform such that its spectral runoff is minimal, then the bandwidth used for data transmissions may be the same or approximately the same as the channel bandwidth. For example, such mask may serve to pre-distort the waveform such that its spectral runoff or leakage is reduced, minimized, and/or eliminated, thereby allowing the waveform/transmission to occupy the full channel bandwidth.

In a third example, to generate 7 MHz transmissions/waveforms, the downclocked waveform may be generated based on at least one of: (a) a forty (40) MHz IEEE 802.11ac specification waveform that is downclocked to a seven (7) MHz bandwidth waveform and the factor is 40/7; and/or (b) a forty (40) MHz IEEE 802.11n specification waveform that is downclocked to a seven (7) MHz bandwidth waveform and the factor is 40/7.

In a fourth example, to generate 8 MHz transmissions/waveforms, the downclocked waveform may be generated based on at least one of: (a) a forty (40) MHz IEEE 802.11ac specification waveform that is downclocked to an eight (8) MHz bandwidth waveform and the factor is 40/8; and/or (b) a forty (40) MHz IEEE 802.11n specification waveform that is downclocked to an eight (8) MHz bandwidth waveform and the factor is 40/8. This example may be useful, for example, where the television spectrum is divided in to 8 MHz channels and/or data transmissions make use of the full available channel bandwidth.

In a fifth example, to generate 10 MHz transmissions/waveforms, the downclocked waveform may be generated based on at least one of: (a) a forty (40) MHz IEEE 802.11n specification waveform that is downclocked to a ten (10) MHz bandwidth waveform and the factor is four (4); (b) a forty (40) MHz IEEE 802.11ac specification waveform that is downclocked to a ten (10) MHz bandwidth waveform and the factor is four (4); and/or (c) a forty (40) MHz IEEE 802.11n specification waveform that is downclocked to a ten (10) MHz bandwidth waveform and the factor is four (4). This example may be useful, for example, where the two adjacent channels of smaller bandwidth are used to carry a larger bandwidth signal/waveform.

In a sixth example, to generate 12 MHz transmissions/waveforms, the downclocked waveform may be generated based on at least one of: (a) an eighty (80) MHz IEEE 802.11ac specification waveform that is downclocked to a twelve (12) MHz bandwidth waveform and the factor is 40/6; (b) two forty (40) MHz IEEE 802.11n specification waveforms that are downclocked and combined to a twelve (12) MHz bandwidth waveform and the factor is 40/6; (c) two forty (40) MHz IEEE 802.11 ac specification waveforms that are downclocked and combined to a twelve (12) MHz bandwidth waveform and the factor is 40/6; (d) a one hundred sixty (160) MHz IEEE 802.11ac specification waveform that is downclocked to a twelve (12) MHz bandwidth waveform and the factor is 160/12; and/or (e) an eighty (80)+eighty (80) MHz IEEE 802.11ac specification waveforms that are downclocked and combined to a twelve (12) MHz bandwidth waveform and the factor is 160/12.

In a seventh example, to generate 14 MHz transmissions/waveforms, the downclocked waveform may be generated based on at least one of: (a) two forty (40) MHz IEEE 802.11n specification waveforms that are downclocked and combined to a fourteen (14) MHz bandwidth waveform and the factor is 40/7; and/or (b) an eighty (80) MHz IEEE 802.11ac specification waveform that is downclocked to a fourteen (14) MHz bandwidth waveform and the factor is 40/7.

In an eighth example, to generate 16 MHz transmissions/waveforms, the downclocked waveform may be generated based on at least one of: (a) two forty (40) MHz IEEE 802.11n specification waveforms that are downclocked and combined to a sixteen (16) MHz bandwidth waveform and the factor is 40/8; and/or (b) an eighty (80) MHz IEEE 802.11ac specification waveform that is downclocked to a sixteen (16) MHz bandwidth waveform and the factor is 40/8.

In a ninth example, to generate 20 MHz transmissions/waveforms, the downclocked waveform may be generated based on at least one of: (a) an eighty (80) MHz IEEE 802.11ac specification waveform that is downclocked to a twenty (20) MHz bandwidth waveform and the factor is four (4); (b) two forty (40) MHz IEEE 802.11n specification waveforms that are downclocked and then combined into a twenty (20) MHz bandwidth waveform and the factor is four (4); (c) a one hundred-sixty (160) MHz IEEE 802.11ac specification waveform that is downclocked to a twenty (20) MHz bandwidth waveform and the factor is eight (8); and/or (d) an eighty (80)+eighty (80) MHz IEEE 802.11ac specification waveform that is downclocked to a twenty (20) MHz bandwidth waveform and the factor is eight (8).

In a tenth example, to generate 24 MHz transmissions/waveforms, the downclocked waveform may be generated based on at least one of: 16. The method of claim 1, wherein the waveform is at least one of: (a) a one hundred sixty (160) MHz IEEE 802.11ac specification waveform that is downclocked to a twenty-four (24) MHz bandwidth waveform and the factor is 40/6; (b) an eighty (80)+eighty (80) MHz IEEE 802.11ac specification waveform that is downclocked and combined to a twenty-four (24) MHz bandwidth waveform and the factor is 40/6; (c) four forty (40) MHz IEEE 802.11n specification waveforms that is downclocked and combined to a twenty-four (24) MHz bandwidth waveform and the factor is 40/6; and/or (d) four forty (40) MHz IEEE 802.11ac specification waveforms that is downclocked and combined to a twenty-four (24) MHz bandwidth waveform and the factor is 40/6.

In an eleventh example, to generate 28 MHz transmissions/waveforms, the downclocked waveform may be generated based on at least one of: (a) four forty (40) MHz IEEE 802.11 ac specification waveforms that are downclocked and combined to a twenty-eight (28) MHz bandwidth waveform and the factor is 40/7; and/or (b) two eighty (80) MHz IEEE 802.11ac specification waveforms that are downclocked and combined to a twenty-eight (28) MHz bandwidth waveform and the factor is 40/7.

In a twelfth example, to generate 32 MHz transmissions/waveforms, the waveform may be generated based on at least one of: (a) four forty (40) MHz IEEE 802.11n specification waveforms that are downclocked and combined to a thirty-two (32) MHz bandwidth waveform and the factor is 40/8; and/or (b) two eighty (80) MHz IEEE 802.11ac specification waveform that is downclocked and combined to a thirty-two (32) MHz bandwidth waveform and the factor is 40/8.

In a thirteenth example, to the downclocked waveform may be generated from least one of: (a) two forty (40) MHz IEEE 802.11ac specification waveforms that are downclocked and combined into a ten (10) MHz bandwidth waveform and the factor is 8; (b) two forty (40) MHz IEEE 802.11ac specification waveforms that are downclocked and combined into two five (5) MHz+five (5) MHz bandwidth waveform and the factor is 8; (c) two twenty (20) MHz IEEE 802.11ac specification waveforms that are downclocked and combined into an eight (8) MHz bandwidth waveform and the factor is 5; (d) two twenty (20) MHz IEEE 802.11ac specification waveforms that are downclocked and combined to a ten (10) MHz bandwidth waveform and the factor is 4; and/or (e) two forty (40) MHz IEEE 802.11ac specification waveforms that are downclocked and combined to a sixteen (16) MHz bandwidth waveform and the factor is 5.

Exemplary Receiver Device Adapted for Coexistence in White Space TV Channels

Figure 19:
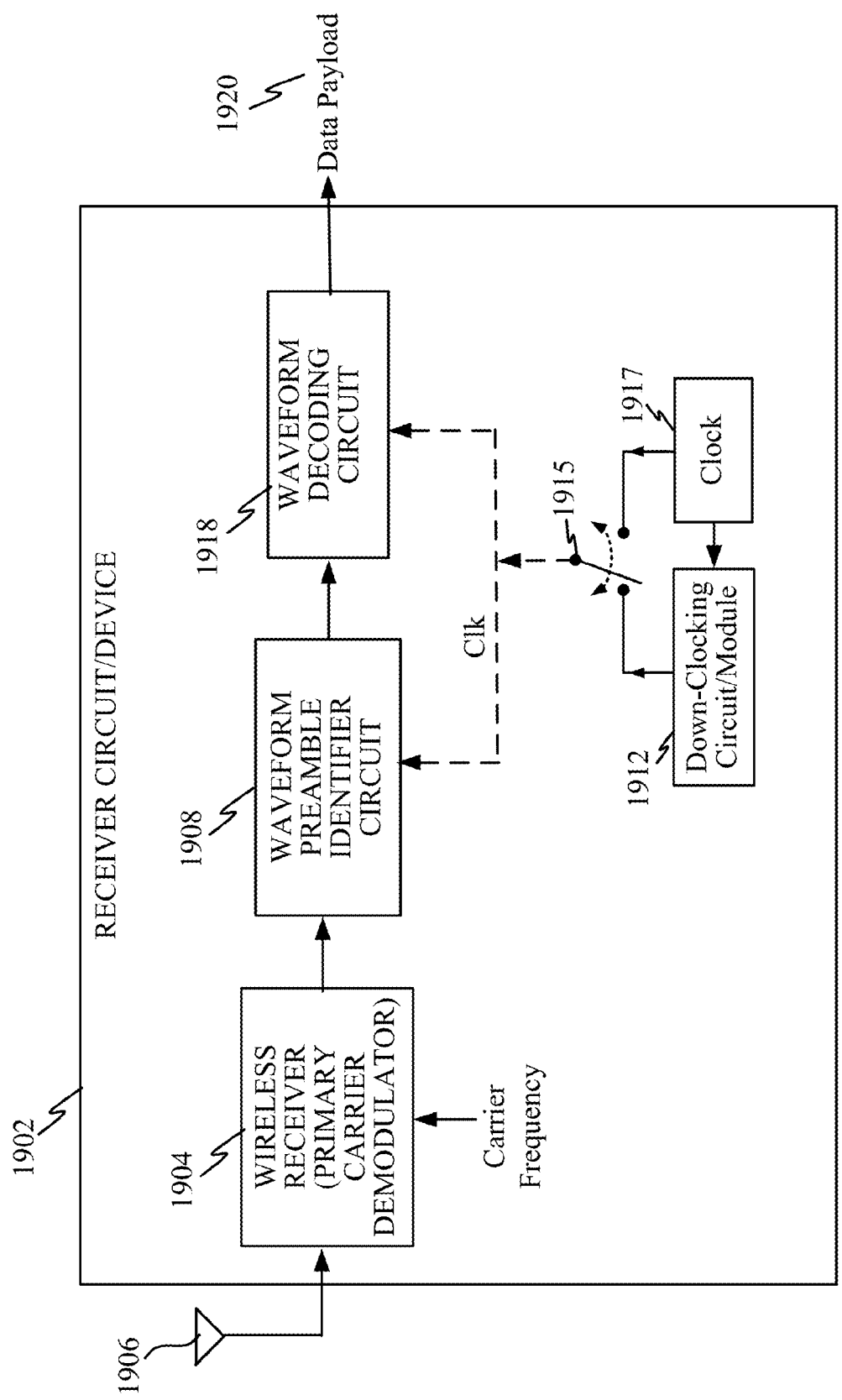
FIG. 19 is a block diagram illustrating an exemplary receiver circuit/device that may be adapted to receive wireless transmissions over a television white space channel.

FIG. 19 is a block diagram illustrating an exemplary receiver circuit/device 1902 that may be adapted to receive wireless transmissions over a television white space channel.

A wireless receiver 1904 (e.g., primary carrier modulator) may receive a waveform via an antenna 1906 and demodulates received waveform from a primary carrier frequency. A waveform preamble identifier circuit 1908 may then use a preamble of the received waveform to identify it. A waveform decoding circuit 1918 may then decode the received waveform to obtain a data payload 1920.

In one example, the receiver circuit/device 1902 may dynamically adjust its clock signal (Clk) used by the receiver chain (e.g., waveform preamble identifier 1908 and/or waveform decoding circuit 1918). For instance, receiver chain may utilize a clock 1917 or a down-clocked version (e.g., lower frequency) of the clock 1917. A downclocking circuit/module 1912 may serve to reduce the frequency of the clock 1917 and provide a lower frequency clock (via switch 1915) to the receiver chain.

In one example, the wireless receiver 1904 may be adapted to: (a) monitor one or more repurposed channels within a television broadcast frequency spectrum for data waveforms, wherein waveforms of different bandwidths coexist within the one or more repurposed channels, and at least a larger waveform has a first bandwidth larger than a channel bandwidth for each repurposed channel, and/or (b) receive a waveform over a repurposed channel from among the one or more repurposed channels, wherein the received waveform has a second bandwidth smaller than the channel bandwidth. The television broadcast frequency spectrum is pre-divided into a plurality of channels of equal bandwidth and the repurposed channel is selected and repurposed for data transmissions from among the plurality of channels. The received waveform may be defined (at least partially) in accordance with one or more standards of the Institute of Electronics and Electrical Engineers (IEEE) 802.11 family of standards. For example, headers/preamble information maybe in accordance with IEEE 802.11ac and/or 802.11n specifications.

In one example, the received waveform may have a first guard band that is different than a second guard band for the larger waveform, a guard band defining an unused frequency space between an edge of the unused channel and a corresponding edge of the downclocked waveform.

The waveform decoding circuit 1918 may be adapted to process the received waveform by applying a downclocking factor to a clock of the receiver device that causes the receiver device to process the received waveform according to the second bandwidth to obtain a data payload from the received waveform. The received waveform and larger waveform may have the same fixed symbol duration. The factor may be dynamically selected from a set of factors that includes two or more of: 4, 5, 6.66, 8, and 10. The factor may also be dynamically selected based on an operating location of the receiver device.

The wireless receiver 1904 may be further adapted to identify an overlapping frequency region between the received waveform and the larger waveform, wherein the received waveform and the overlapping frequency region have the same center frequency and the overlapping frequency region has a third bandwidth. The received waveform may include (a) a first portion of a preamble that is encoded within the third bandwidth of the overlapping frequency region; and/or (b) a second portion of the preamble encoded over the full second bandwidth of the received waveform. The received waveform includes an orthogonal frequency-division multiplexing (OFDM) symbol over the full second bandwidth of the received waveform. The wireless receiver may be further adapted to ascertain a waveform duration in the repurposed channel by monitoring for a signal identifier occurring within the first preamble portion.

In another example, the received waveform may include: (a) a first portion of a preamble that is encoded within a third bandwidth that is smaller than the second bandwidth of the received waveform; and/or (b) a second portion of the preamble encoded over the full second bandwidth of the received waveform.

Figure 20:
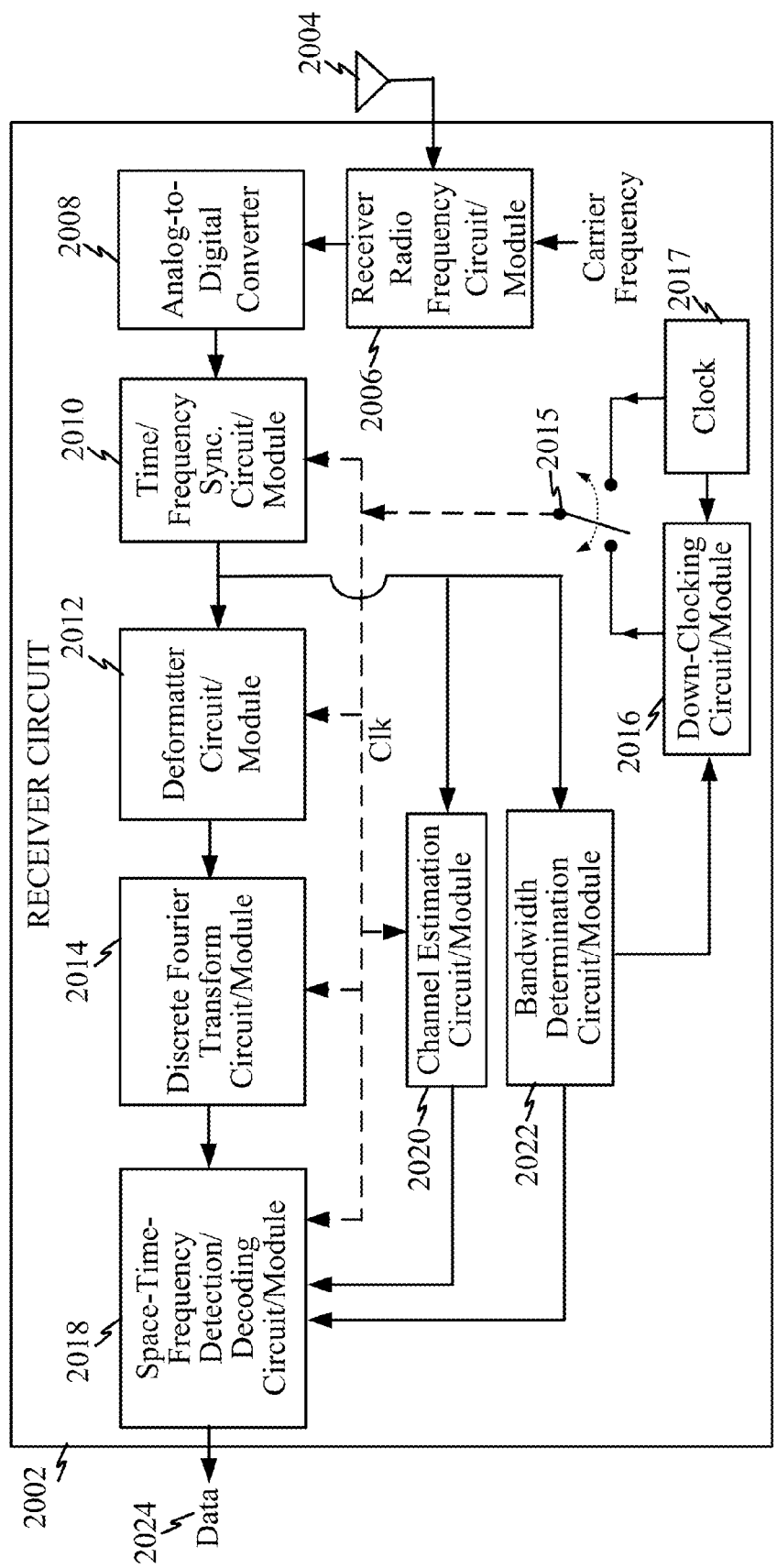
FIG. 20 is a block diagram illustrating an exemplary receiver circuit in which systems and methods for receiving data waveforms in an unused television channel may be implemented.

FIG. 20 is a block diagram illustrating an exemplary receiver circuit 2002 in which systems and methods for receiving data waveforms in an unused television channel may be implemented. For example, the receiver circuit 2002 may include one or more antennas 2004 that feed to one or more receiver radio-frequency circuits/modules 2006. The one or more receiver radio-frequency circuits/modules 2006 may output analog signals to one or more analog-to-digital converters (ADCs) 2008. For example, a receiver radio-frequency circuits/modules 2006 may receive and downconvert a signal, which may be provided to an analog-to-digital converter 2008. As with the transmitter circuit 1602 (FIG. 16), the number of spatial streams processed may or may not be equal to the number of antennas 2004. Furthermore, each spatial stream need not be limited to one antenna 2004, as various beamsteering, orthogonalization, etc., techniques may be used to arrive at a plurality of receiver streams.

The one or more analog-to-digital converters (ADCs) 2008 may convert the received analog signal(s) to one or more digital signal(s). These output(s) of the one or more analog-to-digital converters (ADCs) 2008 may be provided to one or more time and/or frequency synchronization circuits/modules 2010. A time and/or frequency synchronization circuit/module 2010 may (attempt to) synchronize or align the digital signal in time and/or frequency (to a receiver circuit clock, for example).

The (synchronized) output of the time and/or frequency synchronization circuit/module 2010 may be provided to a deformatter circuit/module 2012. For example, the deformatter circuit/module 2012 may receive an output of the time and/or frequency synchronization circuit/module 2010, remove prefixes, etc. and/or parallelize the data for discrete Fourier transform (DFT) processing.

The deformatter circuit/module 2012 output may be provided to a discrete Fourier transform (DFT) circuit/module 2014. The discrete Fourier transform (DFT) circuit/module 2016 may convert one or more signals from the time domain to the frequency domain. The output from the discrete Fourier transform (DFT) circuit/module 2014 may then be processed by a space-time-frequency detection and/or decoding circuit/module 2018. The space-time-frequency detection and/or decoding circuit/module 2018 may output received data 2024 (e.g., the receiver circuit's estimation of the payload data 1604 transmitted by the transmitter circuit 1602).

In some configurations, the receiver circuit 2002 knows the transmit sequences sent as part of a total information sequence. The receiver circuit 2002 may perform channel estimation with the aid of these known transmit sequences. To assist with pilot tone tracking, processing and/or data detection and decoding, a channel estimation circuit/module 2020 may provide estimation signals to the space-time-frequency detection and/or decoding circuit/module 2018 based on the output from the time and/or frequency synchronization circuit/module 2010. Alternatively, if the de-formatting and discrete Fourier transform is the same for the known transmit sequences as for the payload data portion of the total information sequence, the estimation signals may be provided to the space-time-frequency detection and/or decoding circuit/module 2018 based on the output from the discrete Fourier transform (DFT) circuit/module 2014.

A bandwidth determination circuit/module 2022 may use the time/frequency synchronization circuit/module 2010 output to determine a channel bandwidth (for received communications). For example, the bandwidth determination circuit/ module 2022 may receive a bandwidth indication from the transmitter circuit 1602 (FIG. 16) that indicates a channel bandwidth. For instance, the bandwidth determination circuit/module 2022 may obtain an explicit or implicit bandwidth indication. In one configuration, the bandwidth indication may indicate a channel bandwidth of 5 MHz, 10 MHz, etc. The bandwidth determination circuit/module 2022 may determine the bandwidth for received communications based on this indication and provide an indication of the determined bandwidth to the space-time-frequency detection/decoding circuit/module 2018. The space-time frequency detection/decoding circuit/module 2018 may use the determined bandwidth indication to detect and/or decode preamble data and/or payload data from the received signal.

The receiver circuit 2002 may include a switch 2015 and may be adapted to dynamically select between a clock 2017 and/or a downclocked version of the clock 2017. In particular, a downclocking circuit/module 2016 may apply a fixed factor to the clock 2017, thereby reducing the frequency of the clock 2017. The selected clock signal (Clk) is provided to one or more components of the receiver chain (e.g., time-frequency synchronization circuit/module 2010, deformatter 2012, discrete Fourier Transform 2014, and/or space-time-frequency detection/decoding circuit 2018). Reduction in clock frequency by downclocking results in a reduction of the waveform bandwidth from a first bandwidth (e.g., if the frequency of the clock 2017 had been used) to a second bandwidth (using the frequency of the downclocking circuit 2016). This allows the receiver circuit 2002 to monitor and/or receive transmissions over unused television channels that may have a smaller bandwidth than the clock 2017 can provide. Additionally, to compensate for the reduction in bandwidth, the receiver chain may be adapted to use more sub-carriers when decoding the received waveform.

Figure 21:
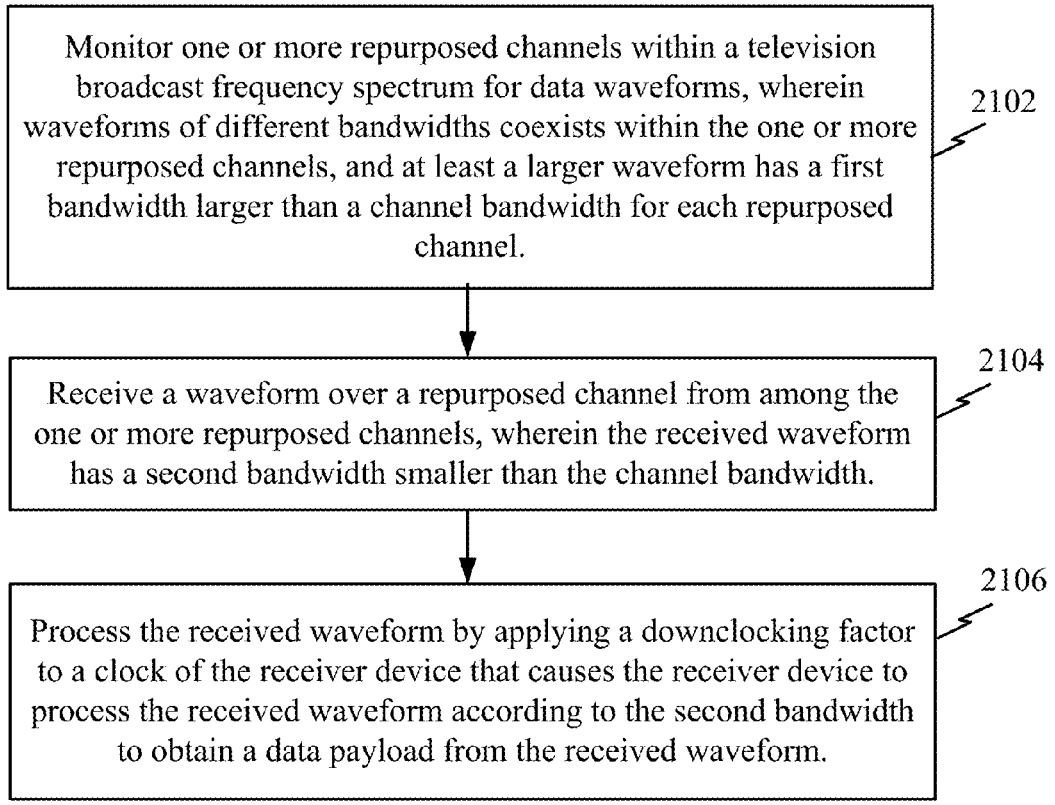
FIG. 21 is a flow diagram illustrating an exemplary method for receiving data over a television white space channel.

FIG. 21 is a flow diagram illustrating an exemplary method for receiving data over a television white space channel. This method may be implemented by a receiver device/circuit as disclosed herein. A receiver device may monitor one or more repurposed channels within a television broadcast frequency spectrum for data waveforms, wherein waveforms of different bandwidths coexist within the one or more repurposed channels, and at least a larger waveform has a first bandwidth larger than a channel bandwidth for each repurposed channel 2102. The television broadcast frequency spectrum may be pre-divided into a plurality of channels of equal bandwidth and the repurposed channel is selected and repurposed for data transmissions from among the plurality of channels.

The receiver device may also receive a waveform over a repurposed channel from among the one or more repurposed channels, wherein the received waveform has a second bandwidth smaller than the channel bandwidth 2104. The received waveform and larger waveform have the same fixed symbol duration.

The receiver device may also process the received waveform by applying a downclocking factor to a clock of the receiver device that causes the receiver device to process the received waveform according to the second bandwidth to obtain a data payload from the received waveform 2106. In one example, the received waveform may have a first guard band that is different than a second guard band for the larger waveform, a guard band defining an unused frequency space between an edge of the unused channel and a corresponding edge of the downclocked waveform. The received waveform may be defined (at least partially) in accordance with one or more standards of the Institute of Electronics and Electrical Engineers (IEEE) 802.11 family of standards (e.g., preamble structures may be consistent with IEEE 802.11af and/or 802.11n specifications). The downclocking factor may be dynamically selected from a set of factors that includes two or more of: 4, 5, 6.66, 8, and 10. The downclocking factor may be dynamically selected based on an operating location of the receiver device.

In one example, processing the received waveform may include identifying an overlapping frequency region between the received waveform and the larger waveform, wherein the received waveform and the overlapping frequency region have the same center frequency and the overlapping frequency region has a third bandwidth. The received waveform may include: (a) a first portion of a preamble that is encoded within the third bandwidth of the overlapping frequency region; and/or (b) a second portion of the preamble encoded over the full second bandwidth of the received waveform. The received waveform includes an orthogonal frequency-division multiplexing (OFDM) symbol over the full second bandwidth of the received waveform. The method may further ascertain a waveform duration (e.g., PHY frame duration) in the repurposed channel by monitoring for a signal identifier occurring within the first preamble portion.

In another example, the received waveform may include: (a) a first portion of a preamble that is encoded within a third bandwidth that is smaller than the second bandwidth of the received waveform; and/or (b) a second portion of the preamble encoded over the full second bandwidth of the received waveform.

Figure 22:
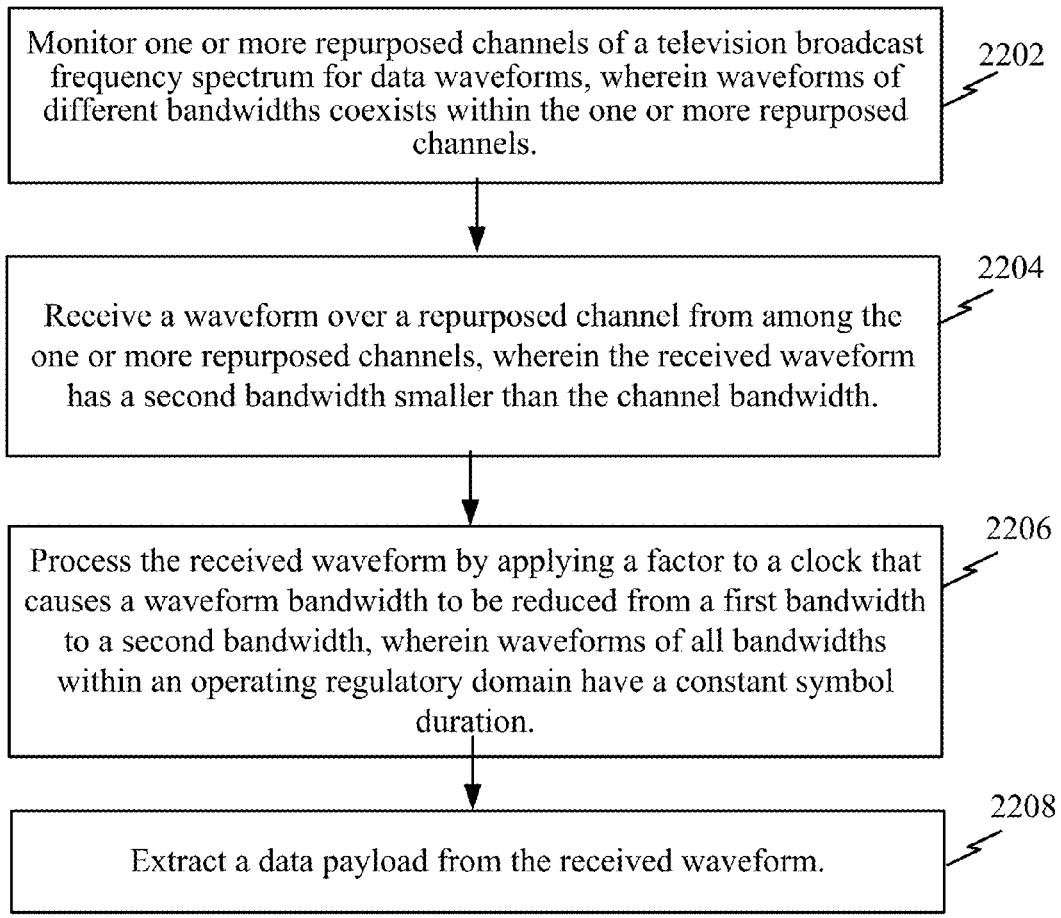
FIG. 22 is a flow diagram illustrating an exemplary method for receiving data over a television white space channel.

FIG. 22 is a flow diagram illustrating an exemplary method for receiving data over a television white space channel. One or more repurposed channels of a television broadcast frequency spectrum may be monitored for data waveforms, wherein waveforms of different bandwidths coexist within the one or more repurposed channels 2202. A waveform may be received over a repurposed channel from among the one or more repurposed channels, wherein the received waveform has a second bandwidth smaller than the channel bandwidth 2204. The received waveform may be processed by applying a factor to a clock that causes a waveform bandwidth to be reduced from a first bandwidth to a second bandwidth, wherein waveforms of all bandwidths within an operating regulatory domain have a constant symbol duration 2206. A data payload may then be extracted or obtained from the received waveform 2208. The second bandwidth of the downclocked waveform may be equal to the channel bandwidth. The factor may be dynamically selected from a set of factors that includes two or more of: 4, 5, 6.66, 8, and 10. The television broadcast frequency spectrum may be pre-divided into a plurality of channels of equal bandwidth and the unused channel is selected and repurposed for data transmissions from among the plurality of channels. The pre-defined channel bandwidth may be associated with the operating regulatory domain and varies between two different regulatory domains. The operating regulatory domain may be associated with a region and defines a wireless communication standard applied in that region.

The receiver circuits/devices 1416, 1902, and 2002 may be adapted to perform one or more features illustrated in FIGS. 2-13 and 21-24.

One or more of the components, steps, features and/or functions illustrated in the Figures may be rearranged and/or combined into a single component, step, feature or function or embodied in several components, steps, or functions. Additional elements, components, steps, and/or functions may also be added without departing from the features disclosed herein. The apparatus, devices, and/or components illustrated in FIGS. 1, 14, 15, 16, 19 and/or 20 may be configured to perform one or more of the methods, features, functions or steps described in FIG. 2-13, 17-18, and/or 21-24. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium or processor-readable medium such as a non-transitory storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method comprising:
    monitoring one or more repurposed channels of a plurality of repurposed channels within a television broadcast frequency spectrum for data waveforms, wherein each of the plurality of repurposed channels has a channel bandwidth, and wherein a first data waveform spans multiple repurposed channels of the plurality of repurposed channels;
    receiving a particular data waveform over a particular repurposed channel from among the one or more repurposed channels, wherein the particular data waveform has a second bandwidth smaller than the channel bandwidth of the particular repurposed channel, and wherein a first component of the particular data waveform and a first component of the first data waveform have a center frequency that matches a center frequency of the particular repurposed channel,
    wherein the first component of the particular data waveform is associated with a first portion of a first preamble of a data payload and the first component of the particular data waveform has a third bandwidth and is located within an overlapping frequency region between the particular data waveform and the first data waveform;
    wherein a second component of the particular data waveform is associated with a second portion of the first preamble and the second component of the particular data waveform has a fourth bandwidth;
    ascertaining a duration of the particular data waveform by monitoring for a signal identifier encoded within the first component of the particular data waveform;
    applying a downclocking factor to a clock of a receiver device to reduce a frequency of the clock based on the duration; and
    processing, by the receiver device, the particular data waveform to obtain the data payload, wherein processing the particular data waveform includes sampling the particular data waveform at a sampling rate based on the reduced frequency.

2. The method of claim 1, wherein the particular data waveform and the first data waveform have a same fixed symbol duration, and wherein the particular data waveform is defined in accordance with one or more standards of an Institute of Electronics and Electrical Engineers (IEEE) 802.11 family of standards.

3. The method of claim 1, wherein the particular data waveform is associated with a first guard band that is different than a second guard band associated with the first data waveform, wherein the first guard band defines a first unused frequency space between an edge of the particular repurposed channel and a corresponding edge of the particular data waveform, and the second guard band defines a second unused frequency space between the edge of the particular repurposed channel and a corresponding edge of the first data waveform.

4. The method of claim 1, wherein the downclocking factor is dynamically selected from a set of factors that includes two or more of: 4, 5, 6.66, 8, and 10.

5. The method of claim 1, wherein the television broadcast frequency spectrum is pre-divided into a plurality of channels of equal bandwidth.

6. The method of claim 1, wherein processing the particular data waveform includes identifying the overlapping frequency region between the particular data waveform and the first data waveform.

7. The method of claim 1, wherein the first component of the particular data waveform has the third bandwidth that is smaller than the second bandwidth of the particular data waveform.

8. The method of claim 1, wherein the second bandwidth and the fourth bandwidth are equal.

9. The method of claim 1, wherein the first preamble associated with the first component of the particular data waveform includes the first portion and the second portion, wherein the first portion of the first preamble is associated with an omni-legacy portion, and wherein the second portion of the first preamble is associated with a very high throughput portion.

10. The method of claim 1, wherein the data payload comprises a physical layer frame, wherein the first preamble is included in the physical layer frame, and wherein the first preamble comprises a physical layer preamble.

11. The method of claim 4, wherein the downclocking factor reduces the frequency of the clock from a first clock frequency to a second clock frequency.

12. The method of claim 6, wherein the third bandwidth is less than the fourth bandwidth.

13. The method of claim 12, wherein the third bandwidth is 4 Megahertz (MHz), and wherein the center frequency is 3 Mhz.

14. A device comprising:
a clock;
a wireless receiver adapted to:
monitor one or more repurposed channels of a plurality of repurposed channels within a television broadcast frequency spectrum for data waveforms, wherein each of the plurality of repurposed channels has a channel bandwidth, and wherein a first data waveform spans multiple repurposed channels of the plurality of repurposed channels, and
receive a particular waveform over a particular repurposed channel from among the one or more repurposed channels, wherein the particular waveform has a second bandwidth smaller than the channel bandwidth of the particular repurposed channel, and wherein a first component of the particular waveform and a first component of the first data waveform have a center frequency that matches a center frequency of the particular repurposed channel,
wherein the first component of the particular waveform is associated with a first portion of a first preamble of a data payload and the first component of the particular waveform has a third bandwidth and is located within an overlapping frequency region between the particular waveform and the first data waveform;
wherein a second component of the particular waveform is associated with a second portion of the first preamble and the second component of the particular waveform has a fourth bandwidth;
ascertain a duration of the particular waveform by monitoring for a signal identifier encoded within the first component of the particular waveform;
apply a downclocking factor to a clock of a receiver device to reduce a frequency of the clock based on the duration; and
a waveform decoding circuit adapted to process the particular waveform to obtain the data payload, wherein the waveform decoding circuit is further adapted to sample the particular waveform at a sampling rate based on the reduced frequency.

15. The device of claim 14, wherein the particular waveform has a first guard band that is different than a second guard band for the first data waveform, wherein the first guard band defines a first unused frequency space between an edge of the particular repurposed channel and a corresponding edge of the particular waveform, and the second guard band defines a second unused frequency space between the edge of the particular repurposed channel and a corresponding edge of the first data waveform.

16. The device of claim 14, wherein the wireless receiver is further adapted to identify the overlapping frequency region between the particular waveform and the first waveform.

17. The device of claim 14, wherein the first component of the particular waveform has the third bandwidth that is smaller than the second bandwidth of the particular waveform.

18. The device of claim 16, wherein an orthogonal frequency-division multiplexing (OFDM) symbol is encoded within the particular waveform.

19. A non-transitory processor-readable medium having one or more instructions which, when executed by one or more processors, causes the one or more processors to perform operations comprising:
monitoring one or more repurposed channels of a plurality of repurposed channels within a television broadcast frequency spectrum for data waveforms, wherein each of the plurality of repurposed channels has a channel bandwidth, and wherein a first data waveform of the data waveforms spans multiple repurposed channels of the plurality of repurposed channels;
receiving a particular data waveform over a particular repurposed channel from among the one or more repurposed channels, wherein the particular data waveform has a second bandwidth smaller than the channel bandwidth of the particular repurposed channel, and wherein a first component of the particular data waveform and a first component of the first data waveform have a center frequency that matches a center frequency of the particular repurposed channel,
wherein the first component of the particular data waveform is associated with a first portion of a first preamble of a data payload and the first component of the particular data waveform has a third bandwidth and is located within an overlapping frequency region between the particular data waveform and the first data waveform;
wherein a second component of the particular data waveform is associated with a second portion of the first preamble and the second component of the particular data waveform has a fourth bandwidth;
ascertaining a duration of the particular data waveform by monitoring for a signal identifier encoded within the first component of the particular data waveform;

applying a downclocking factor to a clock of a receiver device to reduce a frequency of the clock based on the duration; and processing, by the receiver device, the particular data waveform by to obtain the data payload, wherein processing the particular data waveform includes sampling the particular data waveform at a sampling rate based on the reduced frequency.

20. The non-transitory processor-readable medium of claim 19, wherein a first bandwidth of the first data waveform is 10 Megahertz (MHz), the second bandwidth of the particular data waveform is 5 MHz, the channel bandwidth is 6 MHz, and the center frequency is 3 MHz.

* * * * *